United States Patent
Zhang et al.

(10) Patent No.: US 9,869,589 B2
(45) Date of Patent: Jan. 16, 2018

(54) ELECTRONIC DEVICE AND INFORMATION PROCESSING METHOD

(71) Applicants: BEIJING LENOVO SOFTWARE LTD., Beijing (CN); LENOVO (BEIJING) LIMITED, Beijing (CN)

(72) Inventors: Zhenhua Zhang, Beijing (CN); Ke Shang, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 335 days.

(21) Appl. No.: 14/579,310

(22) Filed: Dec. 22, 2014

(65) Prior Publication Data
US 2016/0025564 A1 Jan. 28, 2016

(30) Foreign Application Priority Data

Jul. 23, 2014 (CN) .......................... 2014 1 0353929
Jul. 23, 2014 (CN) .......................... 2014 1 0354434

(51) Int. Cl.
*G01J 3/28* (2006.01)
*G01J 3/12* (2006.01)
(Continued)

(52) U.S. Cl.
CPC ........... *G01J 3/2803* (2013.01); *G01J 3/0205* (2013.01); *G01J 3/12* (2013.01); *G01J 5/60* (2013.01)

(58) Field of Classification Search
CPC ........ G01J 3/28; G01J 3/12; G01J 3/46; G01J 5/60; G02B 1/005
See application file for complete search history.

(56) References Cited

U.S. PATENT DOCUMENTS 4,274,706 A 6/1981 Tangonan
7,217,913 B2 * 5/2007 Fouquet .................... G01J 3/10
250/214 R (Continued)

FOREIGN PATENT DOCUMENTS

CN 1692993 A 11/2005
CN 102575959 A 7/2012
(Continued)

*Primary Examiner* — Michael A Lyons
*Assistant Examiner* — Maurice Smith
(74) *Attorney, Agent, or Firm* — Scully Scott Murphy & Presser

(57) ABSTRACT

The present disclosure discloses an electronic device and an information processing method. The electronic device comprises a light detection unit, including a photonic crystal layer configured to reflect and transmit light with a first wavelength in a first incident light according to a voltage applied to the photonic crystal layer; and a photosensitive layer arranged at a light transmission side of the photonic crystal layer and configured to detect a first parameter of a first transmission light transmitted through the photonic crystal layer when the light with the first wavelength is reflected by the photonic crystal layer, and detect a second parameter of a second transmission light transmitted through the photonic crystal layer when the light with the first wavelength is transmitted through the photonic crystal layer; and a processing unit configured to form a spectrum of the first waveform according to the first parameter and the second parameter.

7 Claims, 12 Drawing Sheets

(51) Int. Cl.
*G01J 3/02* (2006.01)
*G01J 5/60* (2006.01)

(56) References Cited

U.S. PATENT DOCUMENTS

| | | |
|---|---|---|
| 8,830,450 B2 | 9/2014 | Bond et al. |
| 2004/0182994 A1 | 9/2004 | Kikuchi et al. |
| 2007/0148760 A1 | 6/2007 | Klesel et al. |
| 2009/0034566 A1* | 2/2009 | Noda ............... B41J 2/45 372/41 |
| 2009/0086208 A1* | 4/2009 | Kang ............... B82Y 20/00 356/402 |
| 2012/0187849 A1* | 7/2012 | Hikmet ............ G01J 1/06 315/152 |
| 2012/0206726 A1* | 8/2012 | Pervez ............. G01J 3/02 356/402 |
| 2014/0124369 A1* | 5/2014 | Han ................. C25D 15/00 204/478 |

FOREIGN PATENT DOCUMENTS

| | | |
|---|---|---|
| CN | 202330264 U | 7/2012 |
| CN | 203037349 U | 7/2013 |
| JP | 2004-53605 A | 2/2004 |
| WO | WO 2012/015443 A1 | 2/2012 |
| WO | WO 2014/043880 A1 | 3/2014 |

* cited by examiner

ELECTRONIC DEVICE AND INFORMATION PROCESSING METHOD

TECHNICAL FIELD

The present disclosure relates to a field of optics, and more particularly, to an electronic device and an information processing method.

BACKGROUND

A conventional electronic device having a spectrum detection function is comprised of a diffraction grating, a focusing lens, and a photosensitive component, and is configured to divide a light to be detected into a number of beams through the diffraction grating. In order to ensure dispersion of a plurality of beams for detection by the photosensitive component, the photosensitive component generally needs to be in a distance away from the diffraction grating. In addition, in order to detect all beams after the plurality of beams are dispersed, there must be a large enough photosensitive area, which is generally larger than the diffraction grating. Thus, a large enough space must be reserved in the existing electronic device having a spectrum detection function for arranging the diffraction grating and the photosensitive component. However, it is not convenient to enable the electronic device to be miniature and portable. Thus, the diffraction grating and the photosensitive component are not suitable for use in devices used by consumers in daily life.

SUMMARY

In view of this, in an aspect of the present disclosure, a new electronic device capable of spectrum detection is provided, which has advantages such as a small volume and portability. In another aspect of the present disclosure, a light processing method is provided, which can reduce a volume of an electronic device which implements the method and enable the device to be miniature and portable.

In a first aspect of the present disclosure, an electronic device is provided, comprising:

a light detection unit, including a photonic crystal layer configured to reflect and transmit light with a first wavelength in a first incident light according to a voltage applied to the photonic crystal layer; and a photosensitive layer arranged at a light transmission side of the photonic crystal layer and configured to detect a first parameter of a first transmission light transmitted through the photonic crystal layer when the light with the first wavelength is reflected by the photonic crystal layer, and detect a second parameter of a second transmission light transmitted through the photonic crystal layer when the light with the first wavelength is transmitted through the photonic crystal layer; and a processing unit configured to form a spectrum of the first waveform according to the first parameter and the second parameter, wherein, the first parameter is indicative of an intensity of the first transmission light, and the second parameter is indicative of an intensity of the second transmission light.

Preferably, the light detection unit further comprises a light diffusion layer configured to enable the first incident light, which is incident on the light detection unit in an angle more than a first angle, to be incident uniformly on the photonic crystal layer.

Preferably, the light detection unit further comprises a beam orientation layer configured to select the first incident light transmitted in a first direction.

Preferably, the light detection unit further comprises a first transparent electrode layer and a second transparent electrode layer;

the photonic crystal layer is arranged between the first transparent electrode layer and the second transparent electrode layer, wherein, the first transparent electrode layer and the second transparent electrode layer are configured to apply a voltage to the photonic crystal layer.

Preferably, the first transparent electrode layer comprises M first transparent electrodes;

the second transparent electrode layer comprises M second transparent electrodes;

the photonic crystal layer comprises M regions;

an $m^{th}$ first transparent electrode and an $m^{th}$ second transparent electrode form an $m^{th}$ electrode group which is controllable independently;

vertical projections of the $m^{th}$ first transparent electrode and the $m^{th}$ second transparent electrode on the photonic crystal layer are located in an $m^{th}$ region of the photonic crystal layer, wherein, the $m^{th}$ electrode group is configured to apply a voltage to the $m^{th}$ region; and M is an integer not less than 2, and m is a positive integer not more than M.

Preferably, the processing unit is configured to determine a third intensity of the light with the first wavelength according to a difference between the second parameter and the first parameter, and determine the spectrum of the first wavelength according to the third intensity.

Preferably, the electronic device further comprises:

a display unit connected to the processing unit, wherein the processing unit is configured to determine a color temperature value of an environment in which the electronic device is located according to the spectrum, determine an output parameter of the display unit according to the color temperature value, and control display of the display unit according to the output parameter.

In a second aspect of the present disclosure, a light processing method in an electronic device is provided, the electronic device comprising a light detection unit which at least comprises a photonic crystal layer, the light processing method comprising:

applying a first voltage to the photonic crystal layer;

receiving, by the photonic crystal layer, a first incident light, reflecting light with a first wavelength in the first incident light, and forming a first transmission light;

detecting a first parameter of the first transmission light;

applying a second voltage to the photonic crystal layer;

receiving, by the photonic crystal layer, the first incident light, transmitting the light with the first wavelength in the first incident light, and forming a second transmission light;

detecting a second parameter of the second transmission light;

forming a spectrum of the first wavelength according to the first parameter and the second parameter, wherein, the first parameter is indicative of an intensity of the first transmission light, and the second parameter is indicative of an intensity of the second transmission light.

Preferably, the light detection unit further comprises a light diffusion layer; and the method further comprises:

enabling, by the light diffusion layer, the first incident light, which is incident on the light detection unit in an angle more than a first angle, to be uniformly incident on the photonic crystal layer.

Preferably, the light detection unit further comprises a first transparent electrode layer and a second transparent electrode layer;

the photonic crystal layer is arranged between the first transparent electrode layer and the second transparent electrode layer;

applying a first voltage to the photonic crystal layer comprises:

applying, by the first transparent electrode layer and the second transparent electrode layer, the first voltage to the photonic crystal layer; and applying a second voltage to the photonic crystal layer comprises:

applying, by the first transparent electrode layer and the second transparent electrode layer, the second voltage to the photonic crystal layer.

Preferably, applying a first voltage to the photonic crystal layer comprises:

applying, by the first transparent electrode layer and the second transparent electrode layer, the first voltage to the photonic crystal layer at a first timing; and applying a second voltage to the photonic crystal layer comprises:

applying, by the first transparent electrode layer and the second transparent electrode layer, the second voltage to the photonic crystal layer at a second timing.

Preferably, the first transparent electrode layer comprises M first transparent electrodes;

the second transparent electrode layer comprises M second transparent electrodes;

the photonic crystal layer comprises M regions;

an $m^{th}$ first transparent electrode and an $m^{th}$ second transparent electrode form an $m^{th}$ electrode group which is controllable independently;

vertical projections of the $m^{th}$ first transparent electrode and the $m^{th}$ second transparent electrode on the photonic crystal layer are located in an $m^{th}$ region of the photonic crystal layer, wherein, the $m^{th}$ electrode group is configured to apply a voltage to the $m^{th}$ region; and M is an integer not less than 2, and m is a positive integer not more than M;

applying a first voltage to the photonic crystal layer comprises:

applying, by an $n1^{th}$ electrode group, the first voltage to an $n1^{th}$ region at a third timing; and applying a second voltage to the photonic crystal layer comprises:

applying, by an $n2^{th}$ electrode group, the second voltage to an $n2^{th}$ region at the third timing, wherein, n1 a positive integer no more than M, and n2 is a positive integer no more than M.

Preferably, forming a spectrum of the first wavelength according to the first parameter and the second parameter comprises:

determining a third intensity of the light with the first wavelength according to a difference between the second parameter and the first parameter; and forming the spectrum of the first wavelength according to the third intensity and the first wavelength.

Preferably, the method further comprises:

determining, by the processing unit, a color temperature value of an environment where the electronic device is located according to the spectrum of the first wavelength, determining an output parameter of a display unit in the electronic device according to the color temperature value, and controlling display of the display unit according to the output parameter.

In a third aspect of the present disclosure, a light processing method in an electronic device is provided, the electronic device comprising a light detection unit which at least comprises a photonic crystal layer, the light processing method comprising:

detecting an intensity of a first incident light to generate a first parameter;

applying a first voltage to the photonic crystal layer;

receiving, by the photonic crystal layer, the first incident light, and reflecting light with a first wavelength in the first incident light to form a first transmission light;

detecting an intensity of the first transmission light to generate a second parameter;

forming a spectrum of the first wavelength according to the first parameter and the second parameter, wherein, the first parameter is indicative of an intensity of the first incident light, and the second parameter is indicative of an intensity of the first transmission light.

In a fourth aspect of the present disclosure, a light detecting method in an electronic device is provided, the electronic device comprising a light selection unit arranged in a first position and a waveguide unit arranged in a second position, wherein the light selection unit is in a first distance away from the waveguide unit, and the waveguide unit has a light receiving terminal where a light splitting unit is arranged and a light outputting terminal where a photosensitive unit is arranged, the method comprising:

acquiring, by the light selection unit, a current ambient light, and projecting the ambient light to the light splitting unit in a first direction;

splitting, by the light splitting unit, the ambient light into different defined lights with respective single wavelengths, and enabling the different defined lights with respective single wavelengths to be incident on the waveguide unit through the light receiving terminal in respective different directions;

reflecting, by the waveguide unit, the different defined lights in a first reflection manner for traveling in the waveguide unit;

detecting, by the photosensitive unit, an intensity of the light reflected by the waveguide unit which is output from the light outputting terminal of the waveguide unit; and generating a spectrum of the ambient light according to the intensity of the reflected light.

Preferably, the photosensitive unit comprises N sub-photosensitive units configured to respectively receive the respective different defined lights with single wavelengths, where N≥2;

the different defined lights are respectively reflected by the waveguide unit to the respective N sub-photosensitive units in respective different directions;

intensities of the different defined lights in the ambient light are respectively detected by the respective N sub-photosensitive units; and the spectrum of the ambient light is generated according to wavelengths of the different defined lights in the ambient light and the corresponding intensity.

In a fifth aspect of the present disclosure, an electronic device is provided, comprising a light selection unit arranged in a first position and a waveguide unit arranged in a second position, wherein the light selection unit is in a first distance away from the waveguide unit, and the waveguide unit has a light receiving terminal where a light splitting unit is arranged and a light outputting terminal where a photosensitive unit is arranged; and a processing unit, wherein, the light selection unit is configured to acquire a current ambient light, and project the ambient light to the light splitting unit in a first direction;

the light splitting unit is configured to split the ambient light into different defined lights with respective single wavelengths, and enable the different defined lights to be incident on the waveguide unit through the light receiving terminal in respective different directions;

the waveguide unit is configured to reflect the different defined lights with single wavelengths in a first reflection manner for traveling in the waveguide unit;

the photosensitive unit is configured to detect intensities of the different defined lights reflected by the waveguide unit which is output from the light outputting terminal of the waveguide unit; and the processing unit is configured to generate a spectrum of the ambient light according to the intensity of the reflected light.

Preferably, the photosensitive unit comprises N sub-photosensitive units configured to respectively receive the respective different defined lights with single wavelengths, where N≥2;

the waveguide unit is further configured to respectively reflect the different defined lights to the respective N sub-photosensitive units in respective different directions;

the N sub-photosensitive units are configured to respectively detect the intensities of the respective different defined lights in the ambient light; and the processing unit is configured to generate the spectrum of the ambient light according to wavelengths of the different defined lights in the ambient light and corresponding intensity.

Preferably, the electronic device further comprises a display unit, wherein, the processing unit is further configured to determine a color temperature of the ambient light based on the spectrum of the ambient light, and adjust a display parameter of the display unit based on the color temperature of the ambient light to change the color temperature of the display unit.

In the electronic device and light processing method according to the embodiments of the present disclosure, the conventional diffraction grating is substituted with the photonic crystal layer to select the light with the first wavelength. As a principle of angular light splitting is used by the diffraction grating, the diffraction grating needs to be in a distance from the photosensitive layer, and the photosensitive layer needs to be large enough to receive each beam, thereby resulting in a large volume. In the present disclosure, a spacing between the photonic crystal layer and the photosensitive layer may be infinitely near zero, an area of the photosensitive layer is not necessarily larger than the photonic crystal layer, and a thick and an area of the photonic crystal layer per se may be made small. Thus, the photonic crystal layer and the photosensitive layer have advantages such as a small volume, a low mass etc., and thus are suitable for use in portable electronic devices. In addition, it is difficult to manufacture the diffraction grating, thereby causing a high manufacturing cost. In the embodiments of the present disclosure, the diffraction grating is substituted with the photonic crystal layer with a low manufacturing cost, thereby achieving an advantage of a low manufacturing cost.

In addition, in the electronic device according to another embodiment of the present disclosure, a light selection unit is arranged in a first position, a waveguide unit is arranged in a second position, the light selection unit is in a first distance away from the waveguide unit, and the waveguide unit has a light receiving terminal where a light splitting unit is arranged and a light outputting terminal where a photosensitive unit is arranged. After passing through the light selection unit, the ambient light to be detected is projected to the light splitting unit, and the ambient light to be detected is split into multiple paths of lights with single wavelengths by the light splitting unit. Therefore, the embodiment of the present disclosure avoids too long paths after the ambient light is split. Then, the lights are totally reflected in the waveguide unit to extend the paths and expand the distances between various lights with single wavelengths. In this way, it is convenient to detect each path of light by the photosensitive unit. The structure according to the embodiments of the present invention has a small volume, thereby enabling the structure to be suitable for use in the electronic devices which are developed in a miniaturization direction. In the embodiments of the present disclosure, the light splitting unit is a grating, which may be formed by implementing ruling at the light receiving terminal of the waveguide unit, thereby reducing the manufacturing cost.

DETAILED DESCRIPTION OF THE EMBODIMENTS

Technical solutions of the present disclosure will be further described in detail below in combination with accompanying drawings of the description and specific embodiments.

First Device Embodiment

Figure 1:
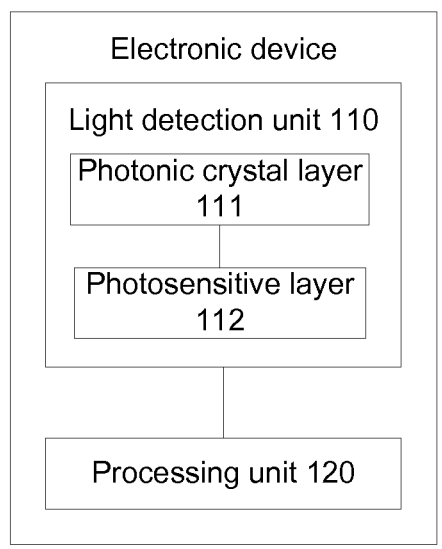
FIG. 1 is a structural diagram of an electronic device according to an embodiment of the present disclosure.

As shown in FIG. 1, an electronic device according to the present embodiment is provided, comprising a light detection unit 110 and a processing unit 120.

The light detection unit 110 includes:

a photonic crystal layer 111 configured to reflect and transmit light with a first wavelength in a first incident light according to a voltage applied to the photonic crystal layer; and a photosensitive layer 112 arranged at a light transmission side of the photonic crystal layer 111 and configured to detect a first parameter of a first transmission light transmitted through the photonic crystal layer 111 when the light with the first wavelength is reflected by the photonic crystal layer 111, and detect a second parameter of a second transmission light transmitted through the photonic crystal layer 111 when the light with the first wavelength is transmitted through the photonic crystal layer 111; and the processing unit 120 is connected to the light detection unit, and is configured to form a spectrum of the first waveform according to the first parameter and the second parameter, wherein, the first parameter is indicative of an intensity of the first transmission light, and the second parameter is indicative of an intensity of the second transmission light.

The first parameter may be a first intensity which is directly indicative of the intensity of the first transmission light, or a first light quantity or first photon number per unit timing which is indirectly indicative of the intensity of the first transmission light etc.; and the second parameter may be a second intensity which is directly indicative of the intensity of the second transmission light, or a second light quantity or second photon number per unit time which is indirectly indicative of the intensity of the second transmission light etc.

The parameter which is indirectly indicative of the intensity may be converted into an intensity parameter based on a function relationship. The function relationship may be specified according to principles of optics, theorem of optics, or laws of optics.

The photonic crystal layer 111 is comprised of photonic crystals. The photonic crystal is an artificial micro-structure formed by periodically arranging media with different refractive indexes, and is a photonic band gap material. The photonic crystal is a material which reflects a light with a specific wavelength. The specific wavelength is decided by the structure of the photonic crystal. The structure of the photonic crystal may be controlled by a voltage. Therefore, the photonic crystal layer may be applied with different voltages to reflect or transmit lights with the same wavelength.

Thereby, in the present embodiment, the photonic crystal layer is configured to receive the first incident light and reflect the light with the first wavelength in the first incident light, and transmit lights in the first incident light excluding the light with the first wavelength when a first voltage is applied to the photonic crystal layer, to form the first transmission light.

The photonic crystal layer is further configured to receive the second incident light and transmit the light with the first wavelength in the first incident light when a second voltage is applied to the photonic crystal layer, to form the second transmission light corresponding to the first incident light.

The first incident light is received by the photonic crystal layer from one side, passes through the photonic crystal layer and then is emitted by the photonic crystal layer from the other side, to form the first transmission light or the second transmission light. The side from which the first transmission light or the second transmission light is emitted is the light transmission side, and the side from which the first incident light is received by the photonic crystal layer is a light incident side.

The first voltage is different from the second voltage.

Figure 2:
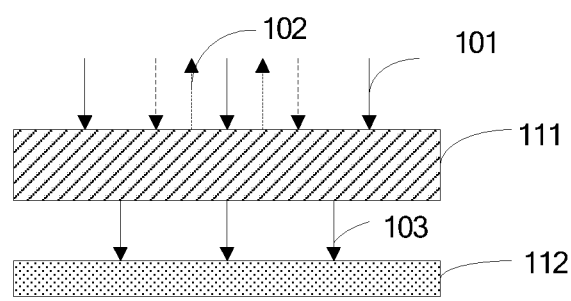
FIG. 2 is a diagram of a light with a first wavelength being reflected by a light detection unit according to an embodiment of the present disclosure.

In FIG. 2, an arrow corresponding to a reference sign 101 represents the first incident light, and a direction in which the arrow points is a direction in which the first incident light propagates; an arrow corresponding to a reference sign 102 represents the light with the first wavelength which is reflected by the photonic crystal layer 111, and a direction in which the arrow points is a direction in which the light with the first wavelength propagates; and an arrow corresponding to a reference sign 103 represents the first transmission light which is formed from transmission through the photonic crystal layer 111, and a direction in which the arrow points is a direction in which the first transmission light propagates. In FIG. 2, a light represented by a dotted arrow is the light with the first wavelength. It can be known from the figure that the first incident light comprises the light with the first wavelength. The first transmission light does not comprise the light with the first wavelength.

Figure 3:
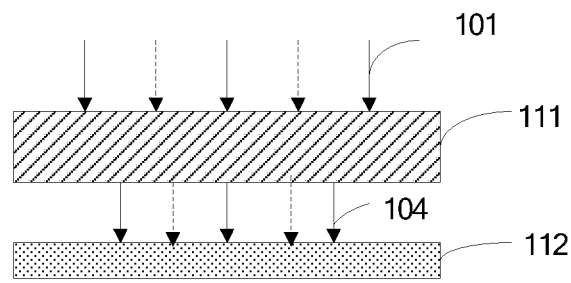
FIG. 3 is a first diagram of a light with a first wavelength being transmitted through a light detection unit according to an embodiment of the present disclosure.

In FIG. 3, the first incident light 101 comprises the light with the first wavelength represented by a dotted arrow. In this case, the photonic crystal layer is configured to transmit the light with the first wavelength according to a voltage applied thereto, and then the light with the first wavelength corresponding to the dotted arrow will be completely transmitted to the photosensitive layer 112. The second transmission light comprises the light with the first wavelength.

The photosensitive layer 112 is configured to detect a first parameter of the first transmission light, and is further configured to detect a second parameter of the first transmission light. If a structure of the photosensitive layer 112 varies, the detected parameters of the first transmission light and the second transmission light also vary.

A specific structure of the photosensitive layer may be a component capable of detecting an optical signal and converting the optical signal into an electrical signal, to form a corresponding electrical signal by sensing an optical signal. Specifically, the photosensitive layer may be any component capable of detecting an intensity, for example a variety of intensity detection sensors, such as a COMS sensor. In practical applications, a photosensitive surface of the photosensitive layer is oriented to the light transmission side of the photonic crystal layer, and is configured to detect an intensity of the transmission light of the photonic crystal layer.

The processing unit 120 may form a spectrum of the first wavelength according to the first parameter and the second parameter detected by the photosensitive layer 112.

A specific structure of the processing unit 120 according to the present embodiment may comprise a processor and a storage medium. The processor is connected to the storage medium through a communication interface such as a bus etc. The storage medium has computer executable instructions stored thereon. The processor executes the computer executable instructions to form the spectrum of the first wavelength. The processor may be an electronic component having a processing function, such as a central processor, a microprocessor, a digital signal processor, or a programmable logic array etc.

In a specific implementation, the processing unit 120 may further be configured to determine a voltage applied to the photonic crystal layer 111.

The photonic crystal layer according to the present embodiment selects the required light with the first wavelength in reflection and transmission manners. In a first aspect, the photosensitive layer needs not to remain in a distance from the photonic crystal layer. That is, a zero-spacing may be achieved between the photonic crystal layer and the photosensitive layer. In a second aspect, no beam dispersion phenomenon occurs in the first transmission light and the second transmission light formed by the photonic crystal layer, and all the first transmission light and the second transmission light may be detected without a very large photosensitive layer. In a third aspect, the photonic crystal layer has a crystal structure, which can achieve reflection or transmission of the light with the first wavelength with a thickness in a micrometer order. Thus, compared with the existing diffraction grating, a volume of the photonic crystal layer is reduced significantly.

Accordingly, with the electronic device according to the present embodiment, there is no need to leave a large space for arranging the light detection unit, thereby reducing the volume of the electronic device. Thus, it is convenient to enable the electronic device to be miniature and portable, and the light detection unit can be used in electronic devices conveniently carried by consumers. The electronic device may specifically be a colorimeter, a spectrometer, a camera, a mobile phone, or a tablet etc.

Second Device Embodiment

Figure 4:
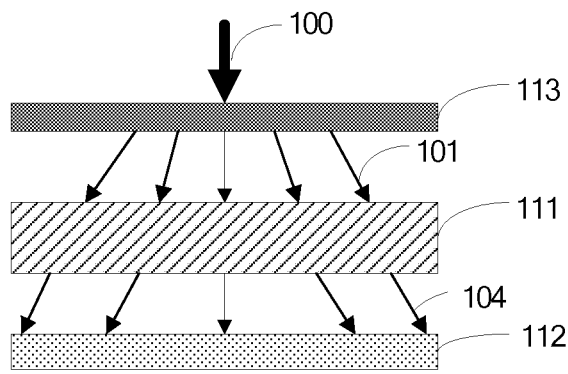
FIG. 4 is a second diagram of a light with a first wavelength being transmitted through a light detection unit according to an embodiment of the present disclosure.

In the second device embodiment, in addition to the same structure as that in the first device embodiment above, the light detection unit further comprises a light diffusion layer 113, as shown in FIG. 4. The light diffusion layer 113 is configured to enable the first incident light, which is incident on the light diffusion layer 113 in an angle more than a first angle, to be incident on the photonic crystal layer 111.

In the present embodiment, an incident angle of the first incident light is an angle between the first incident light and a normal of a light receiving surface of the light detection unit. The light receiving surface of the light detection unit is a surface which receives the first incident light.

In a specific implementation, the photonic crystal layer 111 and the photosensitive layer 112 are arranged in the electronic device, and generally depressed inward in some extent with relative to an edge of the electronic device. In this case, due to a shielding effect of a housing of the electronic device, the first incident light which is incident on the light detection unit 110 in an incident angle more than the first angle from may be leaked from a side of the light detection unit 110 or reflected by the housing of the electronic device, thereby resulting in the incident light not being able to be incident on the photonic crystal layer 111, and thus not being able to be finally incident on and detected by the photosensitive layer 112. In order to avoid such condition, in the present embodiment, the diffusion layer 113 is added for changing a direction of the first incident light to enable the first incident light to be finally incident on the photonic crystal layer 111 and the photosensitive layer 112, thereby improving detection accuracy.

Third Device Embodiment

In the third device embodiment, in addition to the same structure as that in the first device embodiment above, the light detection unit further comprises a light diffusion layer 113, as shown in FIG. 4. The light diffusion layer 113 is configured to enable the first incident light, which is incident on the light detection unit 110 in an angle more than a first angle, to be incident on the photonic crystal layer 111.

Further, the light diffusion layer 113 is configured to enable the first incident light to be uniformly incident on the photonic crystal layer 111. The light diffusion layer 113 is configured to from a first incident light 101 which is uniformly incident on the photonic crystal layer 111.

In FIG. 4, when the first incident light 100 is incident on the photonic crystal layer 111, the first incident light 100 is concentratedly incident on the light diffusion layer 113. After the first incident light 100 is processed by the light diffusion layer 113, the first incident light which is uniformly incident on the photonic crystal layer 111 is formed, as indicated by a reference sign 101.

The light diffusion layer 113 is arranged on a light incident side of the photonic crystal layer 111. A specific structure of the light diffusion layer 113 may be a translucent ground glass or a plate material or film material having a diffusion function, such as a diffusion plate or a diffusion sheet. The diffusion plate and the diffusion sheet enable the light which is incident thereon to disperse in a diffuse reflection manner, thereby achieving an effect of light equalization.

In a specific implementation, the diffusion plate generally has a rigid plate-like structure and a limited degree of bending. The diffusion sheet has a flexible film-like structure. A material may be selected as needed when the electronic device is manufactured in practice. Compared with the ground glass, the diffusion plate and the diffusion sheet have advantages such as a small density and a low mass etc. Thus, it is convenient to further achieve light weight of the electronic device. In addition, the diffusion plate and the diffusion sheet have other advantages such as mature manufacturing processes, convenient material obtainment etc.

In the present embodiment, one such diffusion layer 113 achieves two functions, and has an advantage of simplifying the structure of the light detection unit.

When the light detection unit 110 is not provided with the diffusion layer 113 which enables the first incident light to be uniformly distributed, the processing unit 120 is configured to calculate average intensities of the first transmission light and the second transmission light according to an area of the photosensitive layer and/or an area of the light receiving surface of the light detection unit, the first parameter, and the second parameter.

When the light detection unit 110 is provided with the diffusion layer 113 which enables the first incident light to be uniformly distributed, the light which is incident on the photonic crystal layer 111 is uniformly distributed, and thereby the formed first transmission light and second transmission light may be uniformly transmitted from the photonic crystal layer 111, and be uniformly incident on the photosensitive layer 112. This will not result in a local region of the photosensitive layer 112 not receiving photons. Therefore, the photosensitive layer 112 may directly output a first intensity and a second intensity according to an area of the region of the photosensitive layer 112 where the photons are detected and a number of the detected photons per unit time, without calculating the first intensity and the second intensity by the processor according to the first parameter and the second parameter, thereby simplifying the calculation.

Fourth Device Embodiment

Figure 5:
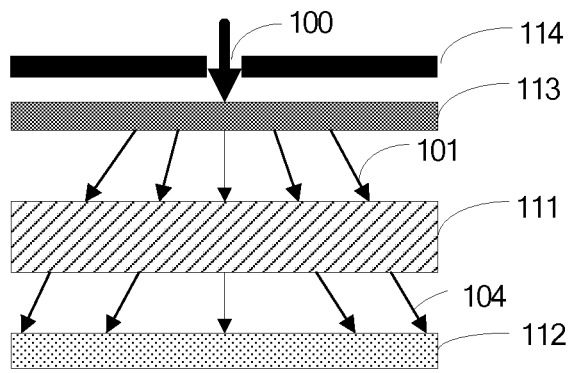
FIG. 5 is a third diagram of a light with a first wavelength being transmitted through a light detection unit according to an embodiment of the present disclosure.

In the fourth device embodiment, in addition to the same structure as that in the first device embodiment above, the light detection unit according to the present embodiment further comprises a beam orientation layer 114, as shown in FIG. 5. The beam orientation layer 114 is configured to select the first incident light propagating in a first direction.

In the present embodiment, improvements are made to the electronic device according to the first device embodiment or the second device embodiment. When the electronic device does not comprise the light diffusion layer 113 according to the second device embodiment, the beam orientation layer 114 is arranged on a side of the photonic crystal layer 111 where the first incident light is received, and the first incident light selected by the beam orientation layer 114 is directly incident on the photonic crystal layer 111 in the first direction. When the electronic device comprises the light diffusion layer 113 according to the second device embodiment, the light diffusion layer 113 is Preferably arranged between the beam orientation layer 114 and the photonic crystal layer 111. In this case, the first incident light is incident on the light diffusion layer 113 in the first direction, and is uniformly incident on the photonic crystal layer 111 after being processed by the light diffusion layer 113.

Assume that after the first incident light is processed by the light diffusion unit 113 and the photonic crystal layer 111, a part of the light is leaked from the light detection unit. Specifically, the first incident light is not completely incident on the photonic crystal layer 111 or the first transmission light and the second transmission light are not completely incident on the photosensitive layer 112. Thereby, an attenuation coefficient for the light detection unit 110 is formed. Obviously, the attenuation coefficient is related to an incident angle of the first incident light, and different incident angles correspond to different attenuation coefficients. After the first incident light which is incident in a direction is processed by the light diffusion unit 113, a part of the light cannot be incident on the photonic crystal layer 111. This results in the part of the light escaping, thereby causing attenuation. After the light is incident on the photonic crystal layer 111 in a direction, a part of transmission light is not necessarily transmitted from a side of the photonic crystal layer 111 opposite to the photosensitive layer 112. This also results in a part of the light escaping, thereby causing attenuation. Therefore, if a position of the photonic crystal layer 111 or the light diffusion layer 113 is fixed, a propagation direction and an incident angle of the incident light are determined. Thus, it may be considered that different incident directions correspond to different attenuation coefficients.

With the setting of the beam orientation layer 114, each time the light detection is performed, the first incident light propagating in the first direction is selected, and thus the attenuation coefficient is obviously constant. Obviously, with the setting of the beam orientation layer 114, detection and calculation of the first intensity and detection and calculation of the second intensity correspond to the same attenuation coefficient instead of different attenuation coefficients, thereby achieving an advantage of high accuracy.

When the beam orientation layer 114 is introduced in the light detection unit 110, due to the selection function of the beam orientation layer 114, a part of the light is shielded. Therefore, when the first intensity and the second intensity are calculated, it also needs to consider an area of the beam orientation layer. When the light detection unit 110 is provided with the beam orientation layer 114, an area of a light receiving surface of the light detection unit 110 is an area of a region of the light orientation layer 114 where the light is allowed to enter the light detection unit 110.

In a specific setting implementation, a thick of the photonic crystal layer and a distance between the photosensitive layer 112 and the photonic crystal layer 111 may be selected as small as possible to avoid the attenuation of the first transmission light and the second transmission light.

A specific structure of the beam orientation layer 114 is a shielding part provided with a slit. The slit is configured to filter a propagation direction of the first incident light which is incident on the light detection unit, and the shielding part is configured to shield other lights which cannot be incident on the photonic crystal layer in the first direction. The shielding part may specifically be a shielding film etc. In FIG. 5, only one slit is shown. However, in a specific implementation, a plurality of slits may be set.

In a specific implementation, an angle of the first incident light transmitted in the first direction with respect to a surface of the light diffusion layer 113 or the photonic crystal layer where the first incident light is received is selected to be in a range from 85° to 95° by adjusting a size of the slit and a distance between the beam orientation layer 114 and the light diffusion layer 113 or between the beam orientation layer 114 and the photonic crystal layer 111. In this way, a quantity of light emitted from a second surface of the photonic crystal layer 111 after the first incident light enters the photonic crystal layer from a first surface of the photonic crystal layer 111 is reduced as much as possible, so that the light in the first incident light which is not reflected by the photonic crystal layer 111 is emitted from a third surface of the photonic crystal layer as much as possible. The first incident light is received by the photonic crystal layer 111 from the first surface. The third surface is located on a side of the photonic crystal layer close to the photosensitive layer 112. In general, the first surface and the third surface are two surfaces arranged in parallel on the photonic crystal layer 111. The second surface is perpendicular to the first surface and the third surface. The second surface corresponds to a thick of the photonic crystal layer 111. In a specific implementation, the thick of the photonic crystal layer may be reduced as much as possible while ensuring that the light with the first wavelength can be reflected and transmitted.

The first incident light is enabled to be normally incident on the photonic crystal layer by determining the first direction of the first incident light, so that a second transmission light and a third transmission light formed from transmission through the photonic crystal layer 111 may only be emitted from the third surface of the photonic crystal layer 111 and be incident on the photosensitive layer 112, thereby improving detection accuracy.

Fifth Device Embodiment

Figure 6A:
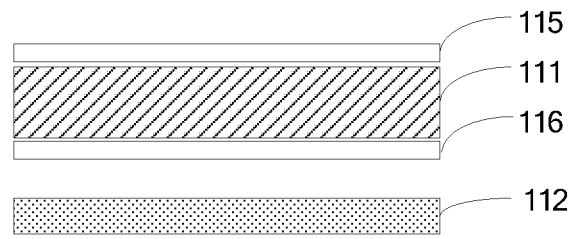
FIG. 6a is a first diagram of a local structure of a light detection unit according to an embodiment of the present disclosure.

In the fifth device embodiment, in addition to the same structure as that in the first device embodiment above, the light detection unit 110 further comprises a first transparent electrode layer 115 and a second transparent electrode layer 116, as shown in FIG. 6a;

the photonic crystal layer 111 is arranged between the first transparent electrode layer 115 and the second transparent electrode layer 116, wherein, the first transparent electrode layer 115 and the second transparent electrode layer 116 are configured to apply a voltage to the photonic crystal layer 111.

In a specific implementation, the first transparent electrode layer 115 and the second transparent electrode layer 116 are connected to two output terminals of a circuit capable of adjusting an output voltage, so as to conveniently change a voltage between the first transparent electrode layer 115 and the second transparent electrode layer 116, thereby changing the voltage applied to the photonic crystal layer 111.

Both the first transparent electrode layer 115 and the second transparent electrode layer 116 are transparent layers for transmission of lights. Both the first transparent electrode layer 115 and the second transparent electrode layer 116 may be comprised of one or more transparent electrodes, such as an Indium Tin Oxide (ITO) transparent electrode or an Indium Gallium Zinc Oxide (IGZO) transparent electrode.

In the present embodiment, a structure for applying the voltage to the photonic crystal layer 111 is provided. The first transparent electrode layer 115 and the second transparent electrode layer 116 arranged on both sides of the photonic crystal layer 111 may use transparent electrodes with a small density, such as ITO or IGZO transparent electrodes. Thus, it is convenient to enable miniaturization and light weight of the electronic device.

Sixth Device Embodiment

In the sixth device embodiment, in addition to the same structure as that in the first device embodiment above, the light detection unit 110 further comprises a first transparent electrode layer 115 and a second transparent electrode layer 116, as shown in FIG. 6a;

the photonic crystal layer 111 is arranged between the first transparent electrode layer 115 and the second transparent electrode layer 116, wherein, the first transparent electrode layer 115 and the second transparent electrode layer 116 are configured to apply a voltage to the photonic crystal layer.

Figure 6B:
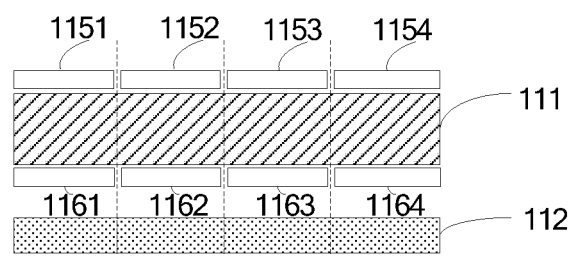
FIG. 6b is a second diagram of a local structure of a light detection unit according to an embodiment of the present disclosure.

As shown in FIG. 6b, the first transparent electrode layer comprises M first transparent electrodes;

the second transparent electrode layer comprises M second transparent electrodes;

the photonic crystal layer comprises M regions;

an $m^{th}$ first transparent electrode and an $m^{th}$ second transparent electrode form an $m^{th}$ electrode group which is controllable independently;

vertical projections of the $m^{th}$ first transparent electrode and the $m^{th}$ second transparent electrode on the photonic crystal layer are located in an $m^{th}$ region of the photonic crystal layer, wherein, the $m^{th}$ electrode group is configured to apply a voltage to the $m^{th}$ region; and M is an integer not less than 2, and m is a positive integer not more than M.

As shown in FIG. 6b, assume that when M=4, the photonic crystal layer is divided into 4 regions, which are a first region, a second region, a third region and a fourth region respectively. Preferably, areas of the various regions are the same. The first transparent electrode layer 115 is comprised of a first transparent electrode 1151, a first transparent electrode 1152, a first transparent electrode 1153 and a first transparent electrode 1154, and the second transparent electrode layer 116 is comprised of a second transparent electrode 1161, a second transparent electrode 1162, a second transparent electrode 1163 and a second transparent electrode 1164. The first transparent electrode 1151 and the second transparent electrode 1161 form an electrode group; the first transparent electrode 1152 and the second transparent electrode 1162 form an electrode group; the first transparent electrode 1153 and the second transparent electrode 1163 form an electrode group; and the first transparent electrode 1154 and the second transparent electrode 1164 form an electrode group. The four regions of the photonic crystal layer 111 are separated by dotted lines illustrated in the figure. Each region may be applied individually with a voltage by an electrode group, to select reflection or transmission lights with different wavelengths.

After being processed by the light diffusion layer 113, the first incident light which is uniformly distributed is received by the photonic crystal layer 111 at a time t. Different voltages are applied to the first to fourth regions of the photonic crystal layer 111. Assume that a light with a wavelength $\lambda 1$ in the first incident light is reflected by the first region, a light with a wavelength $\lambda 2$ in the first incident light is reflected by the second region, a light with a wavelength $\lambda 3$ in the first incident light is reflected by the third region, and a light with a wavelength $\lambda 4$ in the first incident light is reflected by the fourth region.

When it needs to detect spectrums of a red light, a green light, and a blue light by the electronic device according to the present embodiment, the light with the wavelength $\lambda 1$ may be an infrared light, the light with the wavelength $\lambda 2$ may be the red light, the light with the wavelength $\lambda 3$ may be the green light, and the light with the wavelength $\lambda 4$ may be the blue light.

The photosensitive layer 112 is configured to respectively detect corresponding transmission lights formed from transmission through the first to fourth regions.

The processor is configured to determine the spectrum of the red light by using the light formed from transmission through the second region as the first transmission light corresponding to the red light and using the light formed from transmission through the first region as the second transmission light corresponding to the red light; is further configured to determine the spectrum of the green light by using the light formed from transmission through the third region as the first transmission light corresponding to the green light and using the light formed from transmission through the first region as the second transmission light corresponding to the green light; and is further configured to determine the spectrum of the blue light by using the light formed from transmission through the fourth region as the first transmission light corresponding to the blue light and using the light formed from transmission through the first region as the second transmission light corresponding to the blue light. The light with the first wavelength comprises the red light, the blue light and the green light.

In a specific implementation, when the electronic device is configured to detect a spectrum of a visible light, the light with the wavelength 1 may also be a non-visible light such as an ultraviolet light etc.

In the present embodiment, further improvements are made to the fifth device embodiment. Voltages of different regions of the photonic crystal layer may be individually controlled by forming multiple electrode groups which are controllable independently using the two transparent electrode layers, thereby achieving reflection of multiple lights with different wavelengths by the photonic crystal layer at the same time, and accelerating a detection speed.

In a specific implementation, the photonic crystal layer 111 may be as shown in FIG. 6b. Two adjacent regions of the photonic crystal layer 111 may be connected to each other, or a spacing may be arranged between the two adjacent regions. The photonic crystal layer 111 is configured to have a structure in which two adjacent regions are connected, for ease of production, without dividing the photonic crystal layer into small regions, thereby reducing production steps and production difficulty.

Seventh Device Embodiment

In the seventh device embodiment, in addition to the same structure as that in the first device embodiment above, the processing unit 120 is configured to determine a third intensity of the light with the first wavelength according to a difference between the second parameter and the first parameter, and determine the spectrum of the first wavelength according to the third intensity.

Specifically, the processing unit 120 is configured to determine the third intensity of the light with the first wavelength according to a difference between the second intensity and the first intensity and determine the spectrum of the first wavelength according to the third intensity when the first parameter is the first intensity and the second parameter is the second intensity.

The processing unit 120 is configured to convert the first light quantity into a first intensity and the second light quantity into a second intensity, determine the third intensity of the light with the first wavelength according to a difference between the second intensity and the first intensity and determine the spectrum of the first wavelength according to the third intensity when the first parameter is a first light quantity per unit time and the second parameter is a second light quantity per unit time.

Wherein, the processing unit 120 may convert the first light quantity into the first intensity and the second light quantity into the second intensity according to a conversion relational equation between light quantities and intensities, which may be known with reference to common knowledge, and will not be further described in detail here. When the light quantities are converted into the intensities, a light illumination area is preferably an area of the light receiving surface of the light detection unit where the light is allowed to enter. In an example, when the light detection unit is provided with the light orientation layer 114 having a slit, the area of the light receiving surface is an area of the slit.

The second intensity comprises the intensity of the light with the first wavelength, the first intensity does not comprise the intensity of the light with the first wavelength, and the third intensity is the intensity of the light with the first wavelength determined according to the difference between the second intensity and the first intensity. Therefore, the spectrum of the first wavelength may be formed according to the third intensity.

In a specific implementation, when the second transmission light is formed, a light with a wavelength is also reflected by the photonic crystal layer 111. In order to accurately determine the intensity corresponding to the light with the first wavelength, the third intensity may be determined according to the second intensity and a predetermined function relational equation. Specifically, an intensity correction factor is predetermined, which may be a coefficient factor or an additive factor. The coefficient factor may be a first coefficient factor of the second intensity, which is a number larger than 1; and the coefficient factor may also be a second coefficient factor of the difference, which is a number larger than 1.

When the intensity correction factor is an additive factor, the intensity of the light with the first wavelength is equal to the difference plus the additive factor which is a positive number.

The intensity correction factor or the function relational equation may be determined through many experiments before the electronic device leaves the factory.

In a specific implementation, when lights with different wavelengths are detected, the intensity correction factors may be different, or a specific value of the intensity correction factor may also be determined according to the intensities of the second transmission light and the first transmission light detected by the photosensitive unit.

In addition, if it merely needs to obtain a relative spectrum between lights with two different wavelengths in a specific implementation, the second intensity or the difference between the second intensity and the first intensity may not be corrected, and it only needs to ensure the two different wavelengths correspond to the same second intensity. Specifically, if it needs to know a relative spectrum between the blue light and the green light, the following steps may be performed.

The photosensitive layer 112 detects a first intensity value when the blue light is reflected by the photonic crystal layer 111, detects a second intensity value when the green light is reflected by the photonic crystal layer 111, and detects a third intensity value when the infrared light is reflected by the photonic crystal layer 111.

When the photosensitive layer 112 is configured to detect the first intensity value, the second intensity value and the third intensity value, these intensity values correspond to the first incident light with the same light attribute.

When the relative spectrum is formed, a difference between the third intensity value and the first intensity value may be directly used as the third intensity, to form a relative spectrum of the blue light with respect to the infrared light, or a difference between the third intensity value and the second intensity value may be directly used as the third intensity, to form a relative spectrum of the green light with respect to the infrared light.

In conclusion, the electronic device according to the present embodiment is obtained by making further improvements to the any device embodiment above, and it is convenient for the electronic device to form the spectrum of the first wavelength according to the first intensity and the second intensity.

Eight Device Embodiment

In the eighth device embodiment, in addition to the same structure as that in the first device embodiment above, the processing unit 120 is further configured to determine the third intensity of the light with the first wavelength according to the difference between the second parameter and the first parameter, and determine the spectrum of the first wavelength according to the third intensity.

On basis of the seventh device embodiment above, the processing unit 120 according to the present embodiment is further configured to determine a color temperature value of an environment where the electronic device is located according to the spectrum.

The color temperature value is a most general index representing a spectrum quality of a light source. A color temperature of an ambient light may influence users' visual sense.

The electronic device may adjust the display based on the color temperature.

In a specific implementation, the electronic device further comprises a display unit connected to the processing unit. A specific structure of the display unit comprises a display screen, for example display structures such as a crystal display screen, an OLED display screen etc. The processing unit is further configured to output a parameter according to the color temperature value, and control display of the display unit according to the output parameter, thereby improving users' visual experience, and thus improving users' usage satisfaction.

The electronic device according to the present embodiment may be a smart phone, a tablet, an electronic book, a personal digital assistant or a notebook etc., and may comprise a plurality of surfaces. The display unit comprises a display area located on at least a surface of the electronic device, and a side of the photonic crystal layer 111 of the light detection unit where the first incident light is received or the beam orientation layer 114 is arranged on the surface where the display area is located. In this way, a color temperature value of a position where the display area is located can be more accurately detected, so as to control the display of the display unit.

With the first device embodiment to the eighth device embodiment, the electronic device according to the embodiments of the present disclosure has advantages such as a small volume and a low mass, and is a mobile electronic device suitable for being carried by a user.

First Method Embodiment

The present embodiment provides a light processing method in an electronic device, the electronic device comprising a light detection unit which at least comprises a photonic crystal layer.

Figure 7:
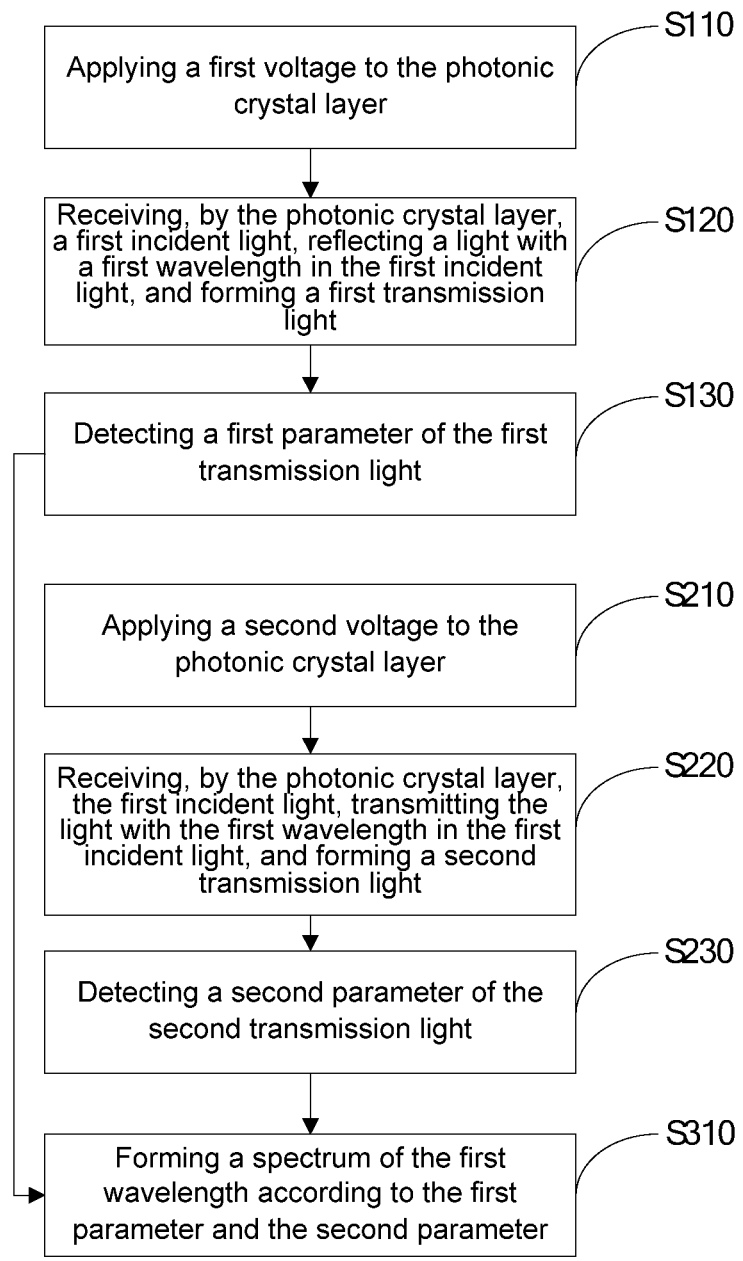
FIG. 7 is a first flowchart of a light processing method according to an embodiment of the present disclosure.

As shown in FIG. 7, the method comprises:

step S110: applying a first voltage to the photonic crystal layer;

step S120: receiving, by the photonic crystal layer, a first incident light, reflecting a light with a first wavelength in the first incident light, and forming a first transmission light;

step S130: detecting a first parameter of the first transmission light;

step S210: applying a second voltage to the photonic crystal layer;

step S220: receiving, by the photonic crystal layer, the first incident light, transmitting the light with the first wavelength in the first incident light, and forming a second transmission light;

step S230: detecting a second parameter of the second transmission light;

step S310: forming a spectrum of the first wavelength according to the first parameter and the second parameter, wherein, the first parameter is indicative of an intensity of the first transmission light, and the second parameter is indicative of an intensity of the second transmission light.

The method according to the present embodiment may be performed by the electronic device according to the first device embodiment to the sixth device embodiment. According to different electronic devices and structures thereof, the above steps may be performed in at least two manners as follows.

In a first manner, when a voltage is uniformly applied to all regions of the photonic crystal layer, the above steps may be performed in an order as follows.

At a first timing, steps S110 to S130 are performed by the electronic device;

at a second timing, steps S210 to S230 are performed by the electronic device;

at a fourth timing, step S310 is performed.

The first timing is different from the second timing, and the fourth timing is later than the first timing and the second timing. In a specific implementation, the electronic device can perform the above steps S110 to S130 or steps S210 to S230 in a short time, and illumination of the environment where the electronic device is located will not change significantly when the electronic device performs steps S110 to S130 or steps S210 to S230.

In a second manner, when voltages are applied to different regions of the photonic crystal layer respectively, if the photonic crystal layer is divided into a first region and a second region, the above steps may be performed in an order as follows.

At a third timing, steps S110 to S130 are performed by an electronic device corresponding to the first region, and steps S210 to S230 are performed by an electronic device corresponding to the second region.

At a fifth timing, step S310 is performed.

The fifth timing is later than the third timing.

In step S120 as described in the present embodiment, after the first incident light is processed by the photonic crystal layer, the first reflection light is formed by reflection and the first transmission light is formed by transmission. The first reflection light comprises the light with the first wavelength.

The second transmission light formed in step S220 comprises the light with the first wavelength.

The electronic device is located in the same environment, the lights incident on the light detection unit are in the same environment, and a time interval between the first timing and the second timing is short. Therefore, it may be considered that the incident lights detected by the light detection unit twice are first incident lights with the same light attribute. The light attribute comprises parameters such as an intensity, a propagation direction and/or a wavelength of the light included in the first incident light etc.

In the present method embodiment, the spectrum of the first wavelength is determined by reflecting or transmitting the light with the same wavelength by the photonic crystal layer under the control of different voltages. Compared with the conventional technology in which detection is performed by a diffraction grating, the volume and mass of the electronic device are reduced. Thus, it is convenient to enable the electronic device to be miniature and portable.

Second Method Embodiment

In the second method embodiment, in addition to the same steps as those in the first method embodiment above, the light detection unit further comprises a light diffusion layer;

the method further comprises:

enabling, by the light diffusion layer, the first incident light, which is incident on the light detection unit in an angle more than a first angle, to be incident on the photonic crystal layer.

With the above step, some lights which are incident in large angles may be enabled to be incident on the photonic crystal layer 111 as much as possible, thereby obtaining a more accurate spectrum.

Figure 8:
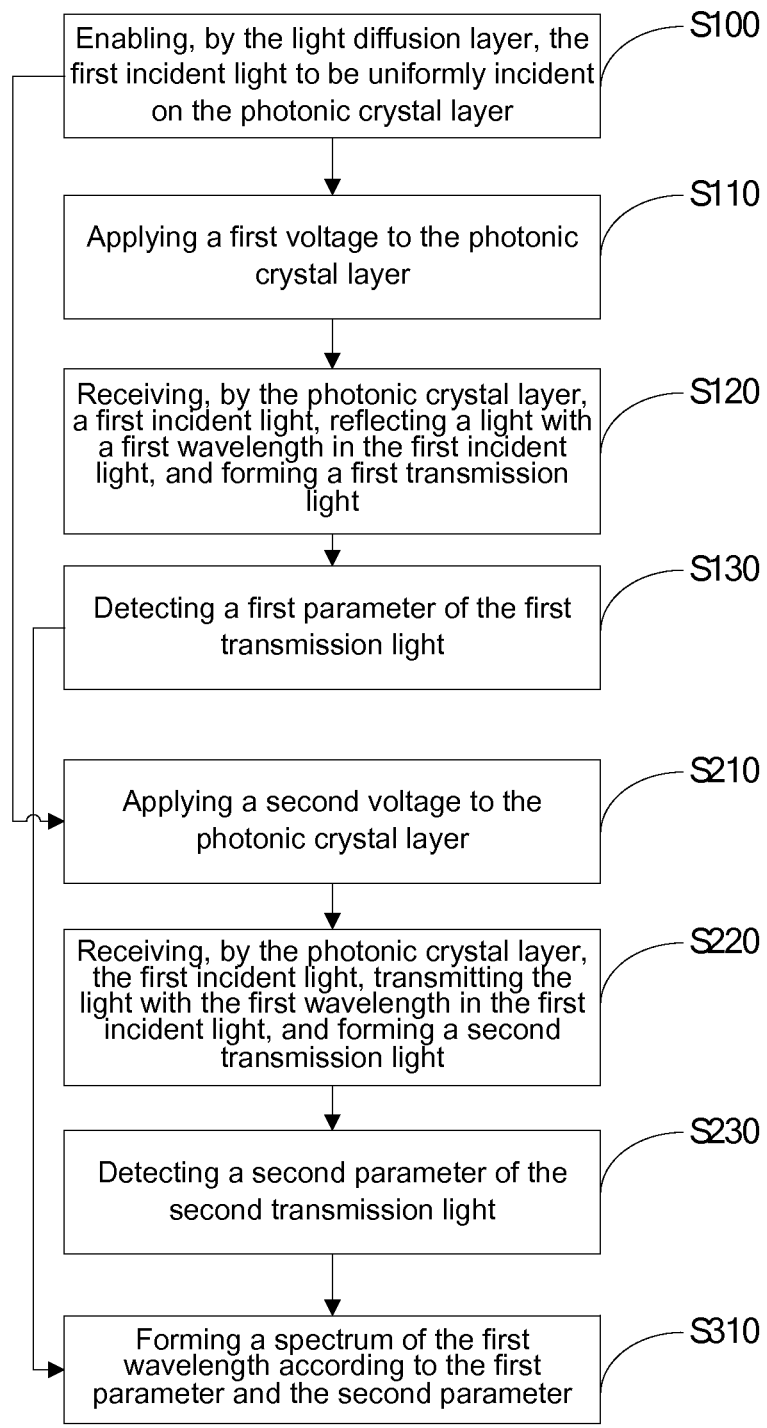
FIG. 8 is a second flowchart of a light processing method according to an embodiment of the present disclosure.

As further improvements of the present embodiment, as shown in FIG. 8, the method further comprises:

step S100: enabling, by the light diffusion layer, the first incident light to be uniformly incident on the photonic crystal layer.

In the present embodiment, further improvements are made to the first method embodiment above. Before the first incident light is incident on the photonic crystal layer, the first incident light is firstly enabled by the light diffusion layer using processes such as scattering etc. to be uniformly distributed in the region where the photonic crystal layer is located, thereby enabling the first incident light to be uniformly incident on the photonic crystal layer. The uniform distribution of the first incident light means that quantities of lights incident on different regions of the photonic crystal layer are the same or a difference between the light quantities is less than a specified threshold.

The first incident light is processed to be uniformly incident on the photonic crystal layer, thereby improving detection accuracy of intensities.

Third Method Embodiment

Figure 9:
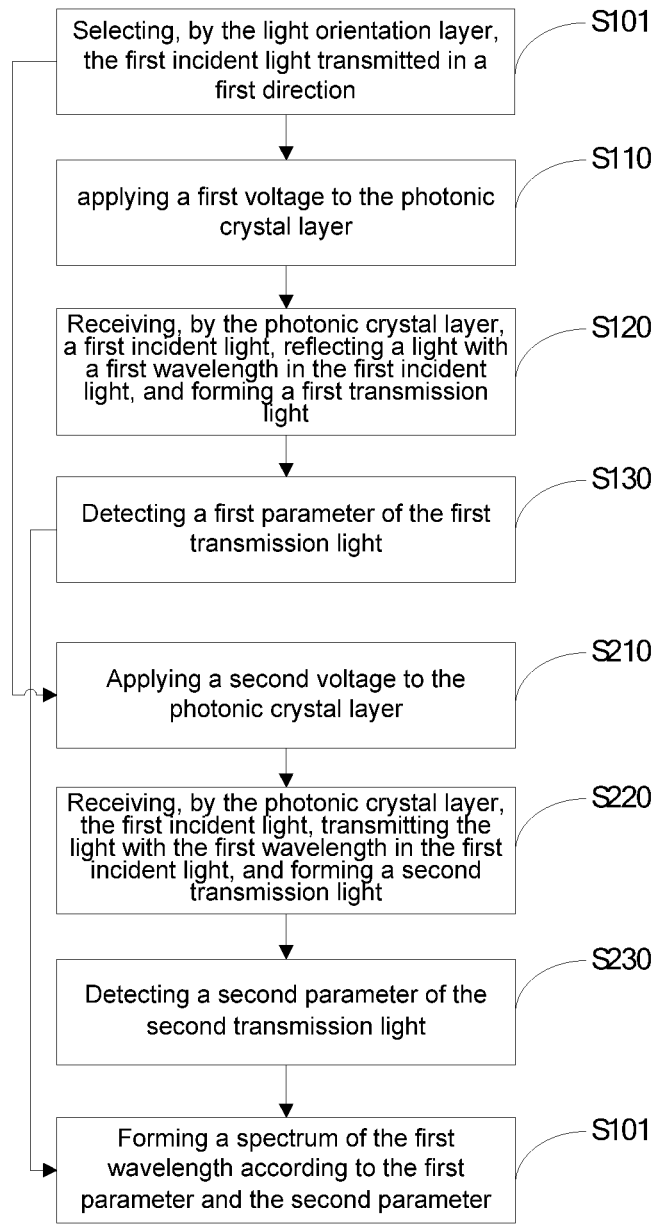
FIG. 9 is a third flowchart of a light processing method according to an embodiment of the present disclosure.

In the third method embodiment, in addition to the same steps as those in the first method embodiment above, the light detection unit further comprises a light orientation layer. As shown in FIG. 9, the method further comprises:

step S101: selecting, by the light orientation layer, the first incident light transmitted in a first direction.

The first incident light transmitted in the first direction is selected by the beam orientation layer. In this way, when measurement is performed by the electronic device described above many times, the incident light transmitted in the first direction in the ambient light is selected, thereby improving detection accuracy. The details of how to improve the detection accuracy may be known with reference to the corresponding description in the third device embodiment, and will not be further described here.

In a specific implementation, the method may further comprise step S100 illustrated in FIG. 8, which is performed before step S101.

Fourth Method Embodiment

In the fourth method embodiment, in addition to the same steps as those in the first method embodiment above, the light detection unit further comprises a first transparent electrode layer and a second transparent electrode layer;

the photonic crystal layer is arranged between the first transparent electrode layer and the second transparent electrode layer;

step S110 comprises:

applying, by the first transparent electrode layer and the second transparent electrode layer, the first voltage to the photonic crystal layer;

step S120 comprises:

applying, by the first transparent electrode layer and the second transparent electrode layer, the second voltage to the photonic crystal layer.

The transparent electrode layer may be an ITO transparent electrode layer or an IGZO transparent electrode layer. It is easy and convenient to apply the voltages to the photonic crystal layer by the first transparent electrode layer and the second transparent electrode layer.

Fifth Method Embodiment

In the fifth method embodiment, in addition to the same steps as those in the first method embodiment above, the light detection unit further comprises a first transparent electrode layer and a second transparent electrode layer;

the photonic crystal layer is arranged between the first transparent electrode layer and the second transparent electrode layer;

step S110 comprises:

applying, by the first transparent electrode layer and the second transparent electrode layer, the first voltage to the photonic crystal layer at a first timing; and step S120 comprises:

applying, by the first transparent electrode layer and the second transparent electrode layer, the second voltage to the photonic crystal layer at a second timing.

In the present embodiment, the voltage is applied to the overall photonic crystal layer by the first transparent electrode layer and the second transparent electrode layer, and thus the photonic crystal layer merely reflects the light with one wavelength at a time. Therefore, the voltage is applied to the photonic crystal layer twice, to obtain a first intensity corresponding to the first parameter and a second intensity corresponding to the second parameter, thereby obtaining the spectrum of the first specified wavelength.

Sixth Method Embodiment

In the sixth method embodiment, in addition to the same steps as those in the first method embodiment above, the light detection unit further comprises a first transparent electrode layer and a second transparent electrode layer;

the photonic crystal layer is arranged between the first transparent electrode layer and the second transparent electrode layer;

the first transparent electrode layer comprises M first transparent electrodes;

the second transparent electrode layer comprises M second transparent electrodes;

the photonic crystal layer comprises M regions;

an $m^{th}$ first transparent electrode and an $m^{th}$ second transparent electrode form an $m^{th}$ electrode group which is controllable independently;

vertical projections of the $m^{th}$ first transparent electrode and the $m^{th}$ second transparent electrode on the photonic crystal layer are located in an $m^{th}$ region of the photonic crystal layer, wherein, the $m^{th}$ electrode group is configured to apply a voltage to the $m^{th}$ region; and M is an integer not less than 2, and m is a positive integer not more than M;

step S110 comprises:

applying, by the first transparent electrode layer and the second transparent electrode layer, the first voltage to the photonic crystal layer at a third timing; and step S120 comprises:

applying, by the first transparent electrode layer and the second transparent electrode layer, the second voltage to the photonic crystal layer at the fourth timing.

In the present embodiment, as the photonic crystal layer is divided into a plurality of regions and a plurality of electrode groups which are controllable independently are formed between the first transparent electrode layer and the second transparent electrode layer, thereby achieving detection of the first parameter and the second parameter at a time and improving the efficiency.

Seventh Method Embodiment

Figure 10:
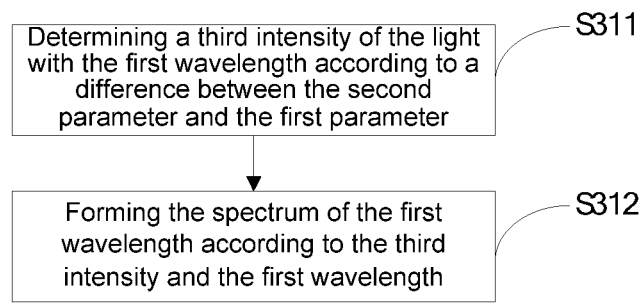
FIG. 10 is a flowchart of forming a spectrum according to an embodiment of the present disclosure.

In the seventh method embodiment, in addition to the same steps as those in the first method embodiment above, as shown in FIG. 10, step S310 comprises:

step S311: determining a third intensity of the light with the first wavelength according to a difference between the second parameter and the first parameter; and Step S312: forming the spectrum of the first wavelength according to the third intensity and the first wavelength.

Step S310 comprises: when the first parameter is the first intensity and the second parameter is the second intensity, determining the third intensity of the light with the first wavelength according to a difference between the second intensity and the first intensity; and forming the spectrum of the first wavelength according to the third intensity and the first wavelength.

Step S310 may comprise: when the first parameter is a first light quantity and the second parameter is a second light quantity, determining a third parameter by calculating a difference between the second parameter and the first parameter;

converting the third parameter into an intensity value, and determining the third intensity of the light with the first wavelength according to the intensity value; and forming the spectrum of the first wavelength according to the third intensity and the first wavelength.

The first intensity does not comprise the intensity of the light with the first wavelength, and the second intensity comprises the intensity of the light with the first wavelength. Therefore, the third intensity may be determined based on the difference between the second intensity and the first intensity. In a specific implementation, when the third intensity is determined, the intensity may be determined according to the difference and a preset function relationship. For example, an intensity correction factor is preset to correct the second intensity or the difference, thereby obtaining an accurate third intensity corresponding to the light with the first wavelength.

In step S310, the spectrum of the first wavelength may be formed according to the relationship between the intensities and the light frequencies or the light wavelengths.

In conclusion, in the present method embodiment, further improvements are made to any embodiment above, and how to determine the spectrum of the first wavelength is specifically described. Therefore, it is easy and convenient to implement the present method embodiment.

Eighth Method Embodiment

In the eighth method embodiment, in addition to the same steps as those in the first method embodiment above, the method further comprises:

forming a color temperature value of an environment where the electronic device is located according to the spectrum.

On basis of the seventh embodiment above, the color temperature value of the environment where the electronic device is located is determined according to the formed spectrum in the present embodiment. The color temperature value can reflect the temperature of the illumination in the environment where the electronic device is located, for example, whether the color temperature is low or high.

The electronic device further comprises a display unit. As a further preferable embodiment of the present embodiment, the method further comprises:

determining an output parameter of the display unit according to the color temperature value, and controlling display of the display unit according to the output parameter.

The electronic device comprises a display unit. A color temperature value is determined according to the spectrum obtained by the light detection unit, an output parameter of the display unit is determined according to the color temperature value, and finally display of the display unit is controlled according to the output parameter. In this way, the display parameter may be adjusted by the electronic device according to an illumination condition of the environment where the electronic device is currently located, to improve users' visual experience on the display unit.

In a specific implementation, a side of the light detection unit where the light is received and the display area of the display unit are on the same side of the electronic device, thereby obtaining more accurate spectrum and thus more accurately controlling the display of the display unit.

In conclusion, the present embodiment provides a light processing method, which is performed by the electronic device according to the embodiments of the present disclosure, to enable conveniently obtaining the spectrum of the first wavelength and controlling the display of the display unit while maintaining a small volume and a low mass of the electronic device.

Ninth Method Embodiment

Figure 11:
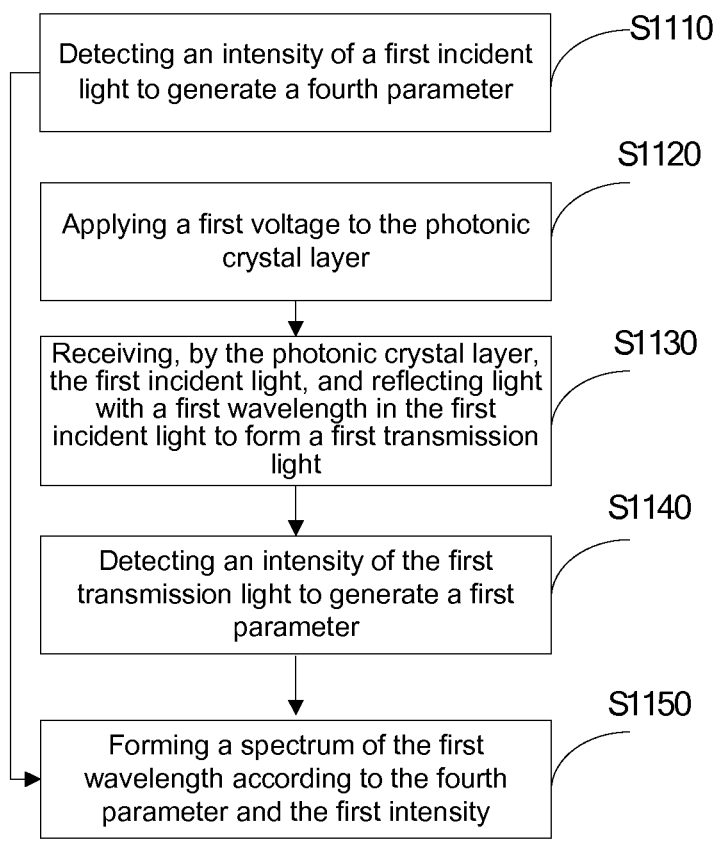
FIG. 11 is a fourth flowchart of a light processing method according to an embodiment of the present disclosure.

As shown in FIG. 11, illustrated is a light processing method in an electronic device, in which the light detection unit at least comprises a photonic crystal layer.

The method comprises:

step S1110: detecting an intensity of a first incident light to generate a fourth parameter;

step S1120: applying a first voltage to the photonic crystal layer;

step S1130: receiving, by the photonic crystal layer, the first incident light, and reflecting light with a first wavelength in the first incident light to form a first transmission light;

step S1140: detecting an intensity of the first transmission light to generate a first parameter;

step S1150: forming a spectrum of the first wavelength according to the fourth parameter and the first intensity, wherein, the fourth parameter is indicative of an intensity of the first incident light, and the first parameter is indicative of an intensity of the first transmission light.

The first parameter of the first incident light is detected in step S1110, and all lights in the first incident light excluding the light with the first wavelength are detected in steps S1120 to S1140;

Therefore, the intensity of the light with the first wavelength in the first incident light may be obtained according to the fourth parameter and the first parameter, thereby forming the spectrum of the first wavelength.

In the method according to the present embodiment, it is convenient to detect and obtain the light with the first wavelength using the characteristics that the light with the first wavelength can be reflected by the photonic crystal layer under the control of the first voltage. In addition, the detection device has a small volume and a low mass, which enables the photonic crystal layer and the photosensitive layer to be used in products used by public consumers.

In a specific implementation, the order of steps S1110 and S1120 is not limited. Further, the electronic device further comprises a sensing unit. Step S1110 comprises:

forming a fourth parameter by detecting, by the sensing unit, a parameter of the first incident light.

The sensing unit may be with the same structure as the photosensitive layer, such as COMS etc. The sensing unit may also be other electronic device with a light collection function, such as a camera.

In conclusion, the present embodiment provides a method, which as compared with the first method embodiment, uses a device instead of the photonic crystal layer and the photosensitive layer to detect the fourth parameter of the first incident light. In this way, when the intensity of the light with the first wavelength is calculated, the intensity can be obtained directly or through conversion according to the difference between the fourth parameter and the first parameter, which is more convenient.

In addition, the embodiments of the present disclosure further provide a light detecting method in an electronic device, the electronic device comprising a light selection unit arranged in a first position and a waveguide unit arranged in a second position, wherein the light selection unit is in a first distance away from the waveguide unit, and the waveguide unit has a light receiving terminal where a light splitting unit is arranged and a light outputting terminal where a photosensitive unit is arranged. It should be noted that in the embodiments of the present disclosure, the positions of the light selection unit and the waveguide unit as well as a relative distance therebetween may be determined according to practical conditions, as long as light paths through the light selection unit are just projected to the waveguide unit, such as a central position of the waveguide unit. Those skilled in the art should understand that it is easy to maintain the positions of the light selection unit and the waveguide unit to enable suitable light paths. In the present embodiment, the waveguide unit is arranged behind the light splitting unit, and the light is split by the light splitting unit, various paths of lights are totally reflected in the waveguide unit. Therefore, the split light paths can be extended only by using a waveguide unit with a small volume, thereby enabling the overall structure of the electronic device according to the embodiments of the present disclosure to have a small volume.

Figure 12:
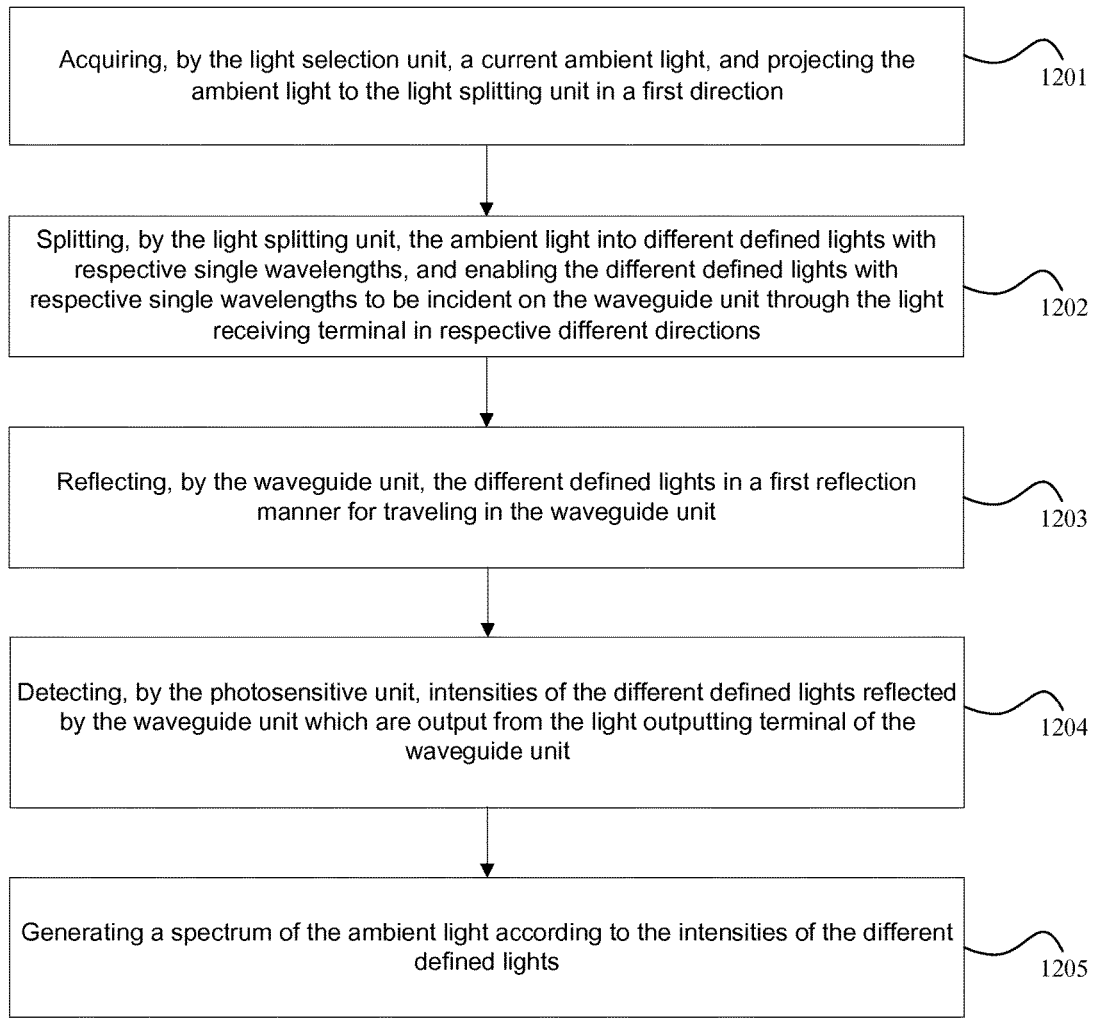
FIG. 12 is a flowchart of a light detecting method according to a first embodiment of the present disclosure.

FIG. 12 is a flowchart of a light detection method according to a first embodiment of the present disclosure. As shown in FIG. 12, the light detecting method according to an embodiment of the present disclosure comprises the following steps.

Step 1201: acquiring, by the light selection unit, a current ambient light, and projecting the ambient light to the light splitting unit in a first direction.

In the embodiment of the present disclosure, the light selection unit is a structure which collects ambient lights to be detected and selects an ambient light to be detected in a defined direction. For example, the light selection unit may enable the light in a direction which is perpendicular to the light receiving terminal of the waveguide unit to be projected to the waveguide unit. In the embodiment of the present disclosure, the projection direction from the light selection unit is not limited, as long as the there are enough lights protected to the waveguide unit and there is no excessive light loss.

Step 1202: splitting, by the light splitting unit, the ambient light into different defined lights with respective single wavelengths, and enabling the different defined lights with respective single wavelengths to be incident on the waveguide unit through the light receiving terminal in respective different directions.

In the embodiment of the present disclosure, a grating is selected as the light splitting unit. In an implementation, the grating may be formed by directly implementing ruling at the light receiving terminal of the waveguide unit. In this way, not only the cost of light detection is saved, but also the light loss is minimized when the ambient light to be detected is split by the light splitting unit. Without considering the cost and light loss, a special grating may also be arranged at the light receiving terminal of the waveguide unit, to split the ambient light to be detected.

In the embodiment of the present disclosure, the ambient light to be detected is split so that the lights with different wavelengths in the ambient light are separated into multiple paths. If it needs to detect the various paths of lights, long paths are needed to separate the various paths of lights completely. In consideration of the application scenarios of the embodiment of the present disclose, it needs to ensure that the overall structure has a small enough volume to enable the structure according to the embodiment of the present disclosure to be applied in the electronic device, thereby achieving detection of the current ambient light. In the embodiment of the present disclosure, a waveguide unit is arranged to solve the problem that the light can be split completely only by using long paths. In the embodiment of the present disclosure, the waveguide unit is made of a fiber material, which has a wider light receiving surface than the fiber. After the lights enter the waveguide unit, the lights are totally reflected in the waveguide unit, and the lights with different wavelengths are finally separated after being reflected many times. In this way, it is very convenient to detect the split lights by the photosensitive unit.

Step 1203: reflecting, by the waveguide unit, the different defined lights in a first reflection manner for traveling in the waveguide unit.

In the embodiment of the present disclosure, after the ambient light to be detected is split, the split lights enter the waveguide unit in total reflection angles, to be totally reflected in the waveguide unit. After the lights are reflected many times, the lights with respective wavelengths are separated far from each other.

Step 1204: detecting, by the photosensitive unit, intensities of the different defined lights reflected by the waveguide unit which are output from the light outputting terminal of the waveguide unit.

In the embodiment of the present disclosure, the photosensitive unit may be implemented by a COMS, or a Charge Coupled Device (CCD). The photosensitive unit may acquire an intensity value of the light. Specifically, the photosensitive unit converts the acquired optical signal into an electrical signal, and represents the intensity value using the electrical signal.

In the embodiment of the present disclosure, the ambient light to be detected is mixed by M primary lights. The ambient light can be split by the splitting unit. That is, the ambient light to be detected is split into M primary lights by the splitting unit. In the embodiment of the present disclosure, intensities of the M primary lights are detected respectively by the photosensitive unit.

Step 1205: generating a spectrum of the ambient light according to the intensities of the different defined lights.

In the embodiment of the present disclosure, a corresponding relationship between intensity values of various defined lights with single wavelengths in the ambient light to be detected and the respective defined lights is used as the spectrum of the ambient light to be detected.

In the embodiment of the present disclosure, after the spectrum of the ambient light is acquired, a color temperature of the ambient light can be calculated by using the spectrum of the ambient light. The display screen of the electronic device may be controlled to automatically adjust brightness by using the color temperature of the ambient light, and change the display color temperature of the electronic device according to users' physiology habits.

Figure 13:
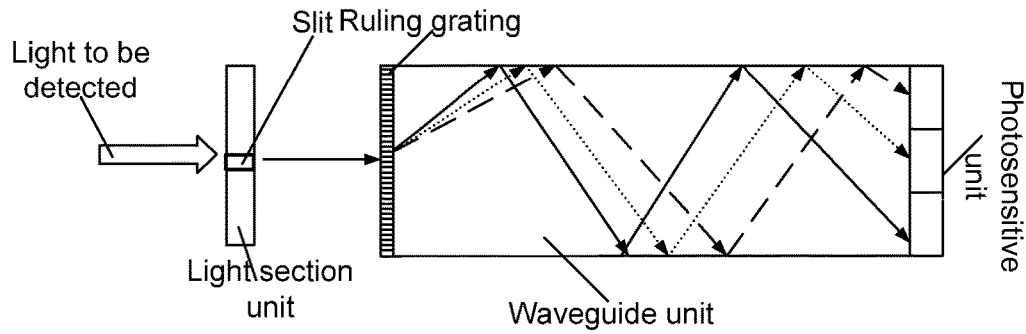
FIG. 13 is a diagram of light detection architecture according to an embodiment of the present disclosure.

The light detecting method according to the embodiment of the present disclosure may be applied in the electronic device. As shown in FIG. 13, the electronic device has a light selection unit arranged in a first position and a waveguide unit arranged in a second position. The light selection unit is in a first distance away from the waveguide unit, and the waveguide unit has a light receiving terminal where a ruling grating is arranged as a light splitting unit and a light outputting terminal where a photosensitive unit is arranged. It should be noted that in the embodiment of the present disclosure, postures of the light selection unit and the waveguide unit as well as a distance therebetween may be determined according to practical conditions, as long as the positions of the two units enable light paths through the light selection unit to be just projected to the waveguide unit, such as a central position of the waveguide unit. Those skilled in the art should understand that it is easy to maintain the positions of the light selection unit and the waveguide unit to enable suitable light paths. In the present embodiment of the present disclosure, the waveguide unit is arranged behind the ruling grating and after the light is split by the ruling grating, various paths of lights are totally reflected in the waveguide unit. Therefore, the paths can be extended only by using a waveguide unit with a small volume, thereby enabling the overall structure of the electronic device according to the embodiments of the present disclosure to have a small volume.

As shown in FIG. 13, the light selection unit has a light barrier, and a slit is arranged in a first position of the light barrier, such as a central position of the light barrier. The ambient light is projected to the ruling grating through the slit in a first direction. The first direction is perpendicular to a direction of the ruling grating or the waveguide unit.

In the embodiment of the present disclosure, the waveguide unit has the same material as the fiber, except that the waveguide unit has a wider light receiving terminal.

Figure 14:
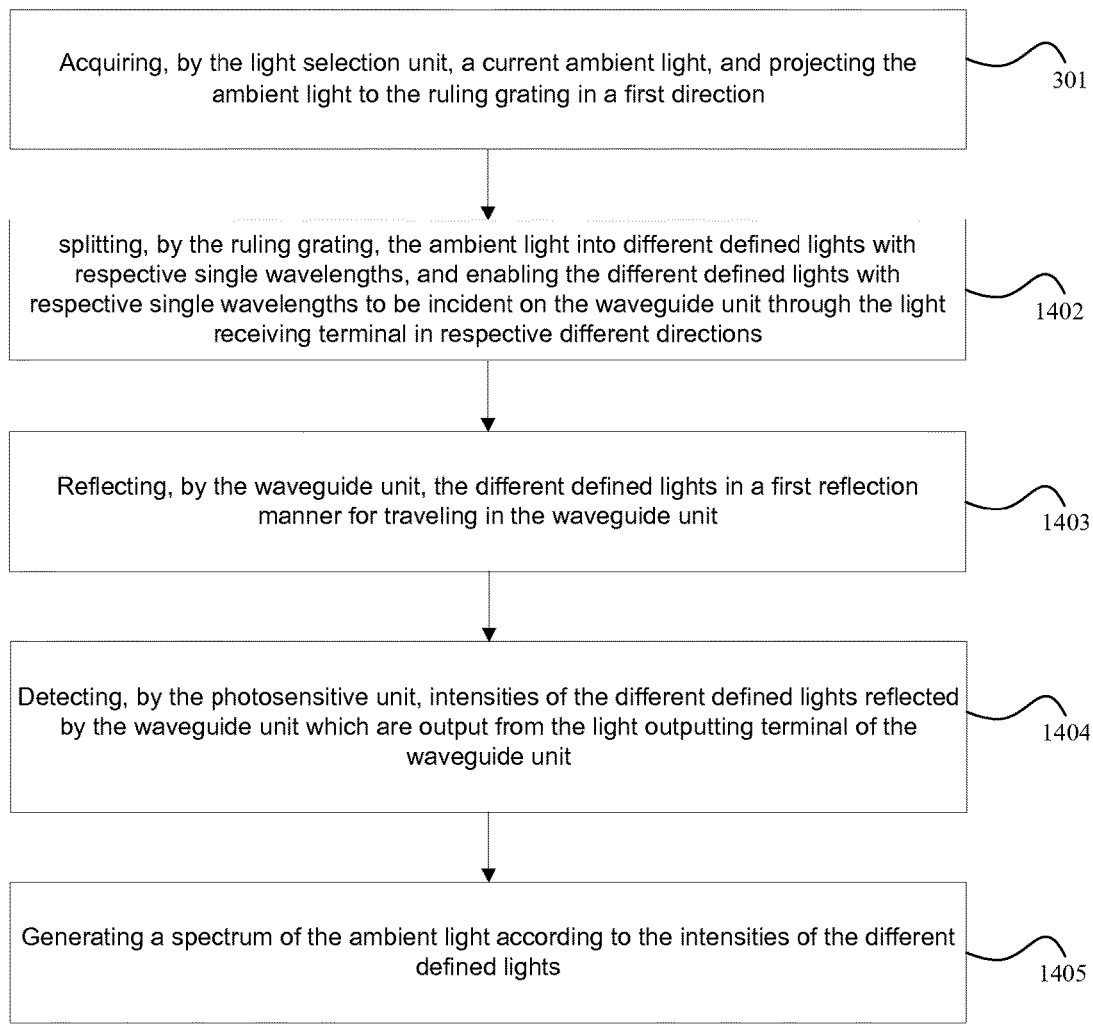
FIG. 14 is a flowchart of a light detecting method according to a second embodiment of the present disclosure.

FIG. 14 is a flowchart of a light detecting method according to a second embodiment of the present disclosure. As shown in FIG. 14, the light detecting method according to the embodiment of the present disclosure comprises the following steps.

Step 1401: acquiring, by the light selection unit, a current ambient light, and projecting the ambient light to the ruling grating in a first direction.

In the embodiment of the present disclosure, the light selection unit is a structure which collects ambient lights to be detected and selects an ambient light to be detected in a defined direction. For example, the light selection unit may enable the light in a direction which is perpendicular to the ruling grating of the light receiving terminal of the waveguide unit to be projected to the ruling grating. In the embodiment of the present disclosure, the projection direction from the light selection unit is not limited, as long as there are enough lights protected to the waveguide unit and there is no excessive light loss.

Step 1402: splitting, by the ruling grating, the ambient light into different defined lights with respective single wavelengths, and enabling the different defined lights with respective single wavelengths to be incident on the waveguide unit through the light receiving terminal in respective different directions.

As shown in FIG. 13, in the embodiment of the present disclosure, the grating is formed by directly implementing ruling at the light receiving terminal of the waveguide unit. In this way, not only the cost of light detection is saved, but also the light loss is minimized when the ambient light to be detected is split by the ruling grating and then is incident on the waveguide unit. Without considering the cost and light loss, a special grating may also be arranged at the light receiving terminal of the waveguide unit, to split the ambient light to be detected.

Step 1403: reflecting, by the waveguide unit, the different defined lights in a first reflection manner for traveling in the waveguide unit.

In the embodiment of the present disclosure, after the ambient light to be detected is split by the ruling grating, the split lights enter the waveguide unit in total reflection angles, to be totally reflected in the waveguide unit. After the lights are reflected many times, the lights with respective wavelengths are separated far from each other.

Step 1404: detecting, by the photosensitive unit, intensities of the different defined lights reflected by the waveguide unit which are output from the light outputting terminal of the waveguide unit.

In the embodiment of the present disclosure, the photosensitive unit may be implemented by a COMS, or a CCD. The photosensitive unit may acquire an intensity value of the light. Specifically, the photosensitive unit converts the acquired optical signal into an electrical signal, and represents the intensity value using the electrical signal.

In the embodiment of the present disclosure, the ambient light to be detected is mixed by M primary lights. The ambient light can be split by the splitting unit. That is, the ambient light to be detected is split into M primary lights by the splitting unit. In the embodiment of the present disclosure, intensities of the M primary lights are detected respectively by the photosensitive unit.

Step 1405: generating a spectrum of the ambient light according to the intensities of the different defined lights.

In the embodiment of the present disclosure, a corresponding relationship between intensity values of various defined lights with single wavelengths in the ambient light to be detected and the respective defined lights is used as the spectrum of the ambient light to be detected.

In the embodiment of the present disclosure, after the spectrum of the ambient light is acquired, a color temperature of the ambient light can be calculated by using the spectrum of the ambient light. The display screen of the electronic device may be controlled to automatically adjust brightness by using the color temperature of the ambient light, and change the display color temperature of the electronic device according to users' physiology habits.

The light detecting method according to the embodiment of the present disclosure may be applied in the electronic device. As shown in FIG. 14, in the present example, the light outputting terminal is arranged on the top of the waveguide unit. A texturing process is performed on the top of the waveguide unit to damage the total reflection condition of a corresponding part on the waveguide unit, so as to enable the lights with different wavelengths to be projected to the photosensitive unit through the light outputting terminal, and enable intensities of various lights with different wavelengths to be detected by the photosensitive unit. In the embodiment of the present disclosure, the waveguide unit is arranged behind the ruling grating and after the light is split by the ruling grating, various paths of lights are totally reflected in the waveguide unit. Therefore, the paths can be extended only by using a waveguide unit with a small volume, thereby enabling the overall structure of the electronic device according to the embodiments of the present disclosure to have a small volume.

Figure 15:
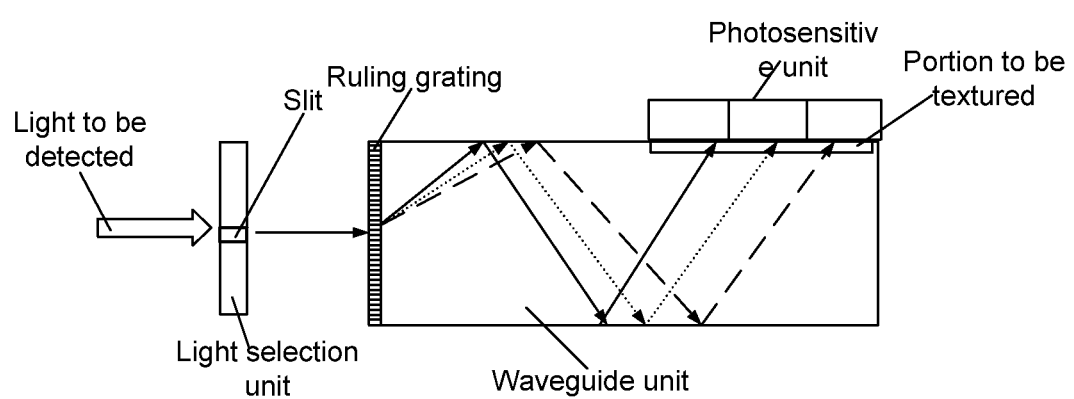
FIG. 15 is a diagram of another light detection architecture according to an embodiment of the present disclosure.

As shown in FIG. 15, the light selection unit has a light barrier, and a slit is arranged in a first position of the light barrier, such as a central position of the light barrier. The ambient light is projected to the ruling grating through the slit in a first direction. The first direction is perpendicular to a direction of the ruling grating or the waveguide unit.

In the embodiment of the present disclosure, the waveguide unit has the same material as the fiber, except that the waveguide unit has a wider light receiving terminal.

Figure 16:
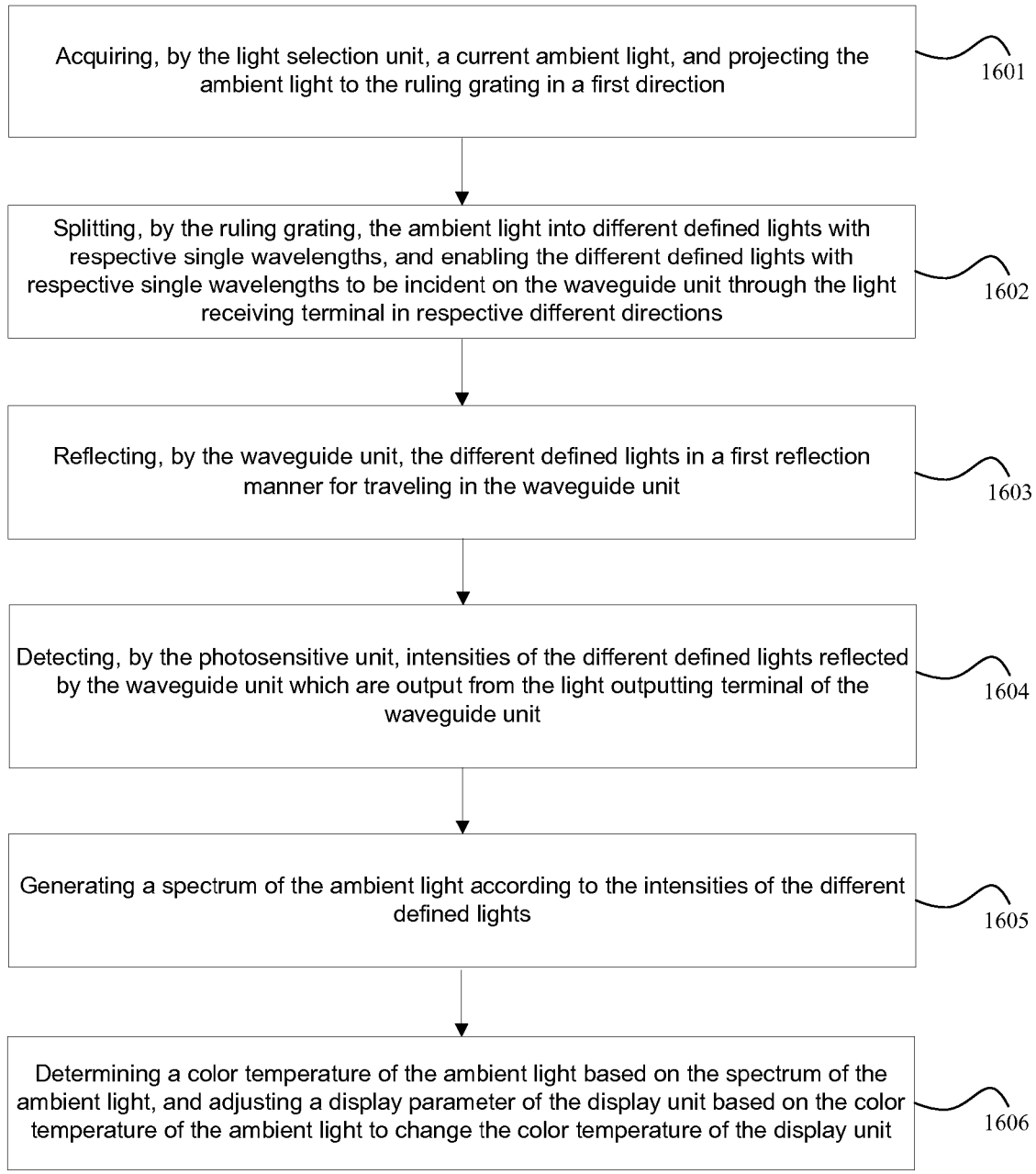
FIG. 16 is a flowchart of a light detecting method according to a third embodiment of the present disclosure.

FIG. 16 is a flowchart of a light detecting method according to a third embodiment of the present disclosure. As shown in FIG. 16, the light detecting method according to the embodiment of the present disclosure comprises the following steps.

Step 1601: acquiring, by the light selection unit, a current ambient light, and projecting the ambient light to the ruling grating in a first direction.

In the embodiment of the present disclosure, the light selection unit is a structure which collects ambient lights to be detected and selects an ambient light to be detected in a defined direction. For example, the light selection unit may enable the light in a direction which is perpendicular to the ruling grating of the light receiving terminal of the waveguide unit to be projected to the ruling grating. In the embodiment of the present disclosure, the projection direction from the light selection unit is not limited, as long as the there are enough lights protected to the waveguide unit and there is no excessive light loss.

Step 1602: splitting, by the ruling grating, the ambient light into different defined lights with respective single wavelengths, and enabling the different defined lights with respective single wavelengths to be incident on the waveguide unit through the light receiving terminal in respective different directions.

As shown in FIG. 15, in the embodiment of the present disclosure, the grating is formed by directly implementing ruling at the light receiving terminal of the waveguide unit. In this way, not only the cost of light detection is saved, but also the light loss is minimized when the ambient light to be detected is split by the ruling grating and then is incident on the waveguide unit. Without considering the cost and light loss, a special grating may also be arranged at the light receiving terminal of the waveguide unit, to split the ambient light to be detected.

Step 1603: reflecting, by the waveguide unit, the different defined lights in a first reflection manner for traveling in the waveguide unit.

In the embodiment of the present disclosure, after the ambient light to be detected is split by the ruling grating, the split lights enter the waveguide unit in total reflection angles, to be totally reflected in the waveguide unit. After the lights are reflected many times, the lights are separated far from each other.

Step 1604: detecting, by the photosensitive unit, intensities of the different defined lights reflected by the waveguide unit which are output from the light outputting terminal of the waveguide unit.

In the embodiment of the present disclosure, the photosensitive unit comprises N sub-photosensitive units configured to respectively receive the respective different defined lights with single wavelengths reflected by respective N sub-photonic crystals, where N≥2. That is, in the embodiment of the present disclosure, the ambient light to be detected is split by the light splitting unit such as a ruling grating into N lights with different wavelengths, and then different paths of lights are reflected correspondingly by the waveguide unit, to extend the light paths and expand distances between the light paths. The photosensitive unit comprised of an array of N sub-photosensitive units is arranged on the various light paths, to respectively detect the lights with different wavelengths reflected by various sub-photonic crystals, thereby acquiring the intensities of the various lights with different wavelengths.

Step 1605: generating a spectrum of the ambient light according to the intensities of the different defined lights.

In the embodiment of the present disclosure, a corresponding relationship between intensity values of various defined lights with single wavelengths in the ambient light to be detected and the respective defined lights is used as the spectrum of the ambient light to be detected.

Step 1606: determining a color temperature of the ambient light based on the spectrum of the ambient light, and adjusting a display parameter of the display unit based on the color temperature of the ambient light to change the color temperature of the display unit.

In an example, if the electronic device is installed with the light detecting structure according to the embodiment of the present disclosure, after the spectrum of the light to be detected is acquired, the color temperature of the light to be detected such as the current ambient light may be calculated using the spectrum, and the display parameter of the display unit is adjusted based on the calculated color temperature of the current ambient light, to change the color temperature of the display unit. In this way, the color temperature of the display unit of the electronic device may be adjusted to be within a range suitable for human eyes for protection of eyesight. The perceptual effects of actual objects in the current environment may also be simulated according to the acquired color temperature. For example, the display screen of the display unit may be controlled to simulate paper books to make the users feel like reading the paper books. The light detecting method according to the embodiment of the present disclosure has a wide application range, which is not limited by the embodiment of the present disclosure.

Figure 17:
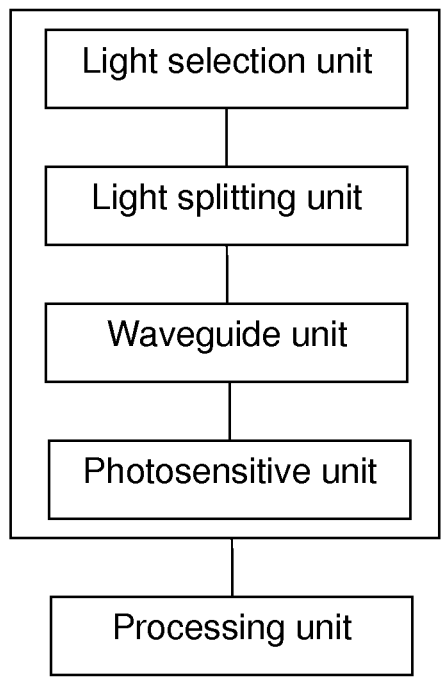
FIG. 17 is a structural diagram of constitution of an electronic device according to a fourth embodiment of the present disclosure.

FIG. 17 is a structural diagram of constitution of an electronic device according to a fourth embodiment of the present disclosure. As shown in FIG. 17, the light selection unit is configured to acquire a current ambient light, and project the ambient light to the light splitting unit in a first direction. As shown in FIGS. 13 and 15, the light selection unit comprises a light barrier, and a slit is arranged in a first position of the light barrier. The slit enables the ambient light to pass through, and enables the ambient light to be projected to the light splitting unit in the first direction.

The light splitting unit is configured to split the ambient light into different defined lights with respective single wavelengths, and enable the different defined lights to be incident on the waveguide unit through the light receiving terminal in respective different directions.

In the embodiment of the present disclosure, the light splitting unit comprises a grating.

As shown in FIGS. 13 and 15, the grating may be formed by directly implementing ruling at the light receiving terminal of the waveguide unit.

The waveguide unit is configured to reflect the different defined lights with single wavelengths in a first reflection manner for traveling in the waveguide unit;

the photosensitive unit is configured to detect intensities of the different defined lights reflected by the waveguide unit which are output from the light outputting terminal of the waveguide unit;

the processing unit is configured to generate a spectrum of the ambient light according to the intensities of the different defined lights.

The electronic device according to the embodiment of the present disclosure comprises but is not limited to a mobile phone, a computer, a tablet, an electronic reader, a personal digital assistant etc.

Figure 18:
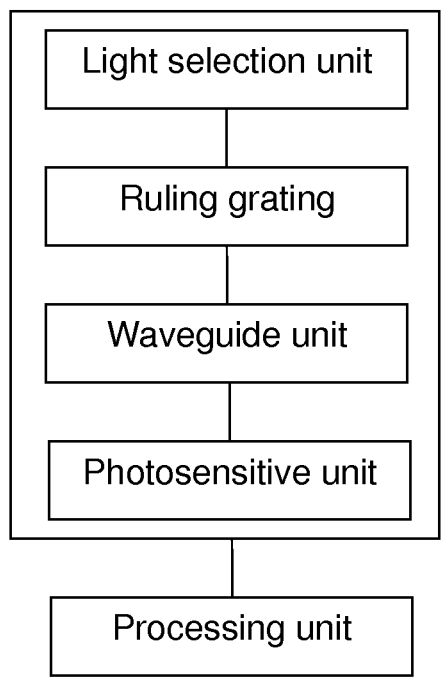
FIG. 18 is a structural diagram of constitution of an electronic device according to a fifth embodiment of the present disclosure.

FIG. 18 is a structural diagram of constitution of an electronic device according to a fifth embodiment of the present disclosure. As shown in FIG. 18, the light selection unit is configured to acquire a current ambient light, and project the ambient light to the light splitting unit in a first direction. As shown in FIGS. 13 and 15, the light selection unit comprises a light barrier, and a slit is arranged in a first position of the light barrier. The slit enables the ambient light to pass through, and enables the ambient light to be projected to the light splitting unit in the first direction.

The light splitting unit is configured to split the ambient light into different defined lights with respective single wavelengths, and enable the different defined lights to be incident on the waveguide unit through the light receiving terminal in respective different directions.

In the embodiment of the present disclosure, the light splitting unit comprises a grating.

As shown in FIGS. 13 and 15, the grating may be formed by directly implementing ruling at the light receiving terminal of the waveguide unit.

The waveguide unit is configured to reflect the different defined lights with single wavelengths in a first reflection manner for traveling in the waveguide unit; the photosensitive unit is configured to detect intensities of the different defined lights reflected by the waveguide unit which are output from the light outputting terminal of the waveguide unit.

In the embodiment of the present disclosure, the photosensitive unit comprises N sub-photosensitive units configured to respectively receive the respective different defined lights with single wavelengths reflected by respective N sub-photonic crystals, where N≥2. That is, in the embodiment of the present disclosure, the ambient light to be detected is split by the light splitting unit such as a ruling grating into N lights with different wavelengths, and then different paths of lights are reflected correspondingly by the waveguide unit, to extend the light paths and expand distances between the light paths. The photosensitive unit comprised of an array of N sub-photosensitive units is arranged on the various light paths, to respectively detect the lights with different wavelengths reflected by various sub-photonic crystals, thereby acquiring the intensities of the various lights with different wavelengths.

The processing unit is configured to generate a spectrum of the ambient light according to the intensities of the different defined lights.

Figure 19:
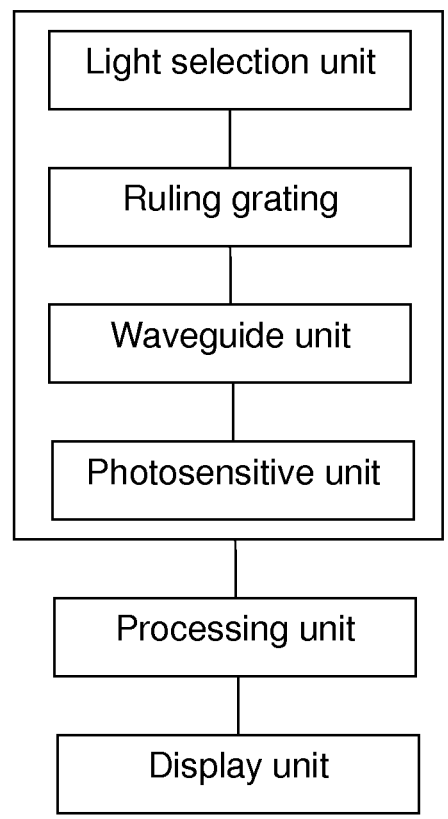
FIG. 19 is a structural diagram of constitution of an electronic device according to a sixth embodiment of the present disclosure.

FIG. 19 is a structural diagram of constitution of an electronic device according to a sixth embodiment of the present disclosure. As shown in FIG. 19, the light selection unit is configured to acquire a current ambient light, and project the ambient light to the light splitting unit in a first direction. As shown in FIGS. 13 and 15, the light selection unit comprises a light barrier, and a slit is arranged in a first position of the light barrier. The slit enables the ambient light to pass through, and enables the ambient light to be projected to the light splitting unit in the first direction.

As shown in FIG. 15, the light outputting terminal according to the embodiment of the present disclosure is formed by performing a surface texturing process on or ruling an exit grating at the light outputting terminal of the waveguide unit so that a first reflection requirement is not satisfied at the light outputting terminal of the waveguide unit.

The light splitting unit is configured to split the ambient light into different defined lights with respective single wavelengths, and enable the different defined lights to be incident on the waveguide unit through the light receiving terminal in respective different directions.

In the embodiment of the present disclosure, the light splitting unit comprises a grating, which is formed by implementing ruling at the light receiving terminal of the waveguide unit.

The waveguide unit is configured to reflect the different defined lights with single wavelengths in a first reflection manner for traveling in the waveguide unit;

the photosensitive unit is configured to detect intensities of the different defined lights reflected by the waveguide unit which are output from the light outputting terminal of the waveguide unit;

the processing unit is configured to generate a spectrum of the ambient light according to the intensities of the different defined lights.

The electronic device according to the embodiment of the present disclosure further comprises a display unit. The processing unit is further configured to determine a color temperature of the ambient light based on the spectrum of the ambient light, and adjust a display parameter of the display unit based on the color temperature of the ambient light to change the color temperature of the display unit.

In an example, if the electronic device is installed with the light detecting structure according to the embodiment of the present disclosure, after the spectrum of the light to be detected is acquired, the color temperature of the light to be detected such as the current ambient light may be calculated using the spectrum, and the display parameter of the display unit is adjusted based on the calculated color temperature of the current ambient light, to change the color temperature of the display unit.

It should be understood that the devices and methods disclosed in the embodiments of the present disclosure may be implemented in other manners. The device embodiments as described above are merely illustrative. For example, the division of the units is merely a logically functional division, and in practice, there may be other division manners. For example, multiple units or components may be combined or may be integrated into another system, or some features may be ignored or may not be implemented. In addition, various constituent parts, which are displayed or discussed as being coupled or communicatively connected directly, may also be coupled or communicatively connected indirectly via some interfaces, devices or units in an electrical manner, a mechanical manner, or other manners.

The above units described as separate components may be or may not be separated physically. The components displayed as units may be or may not be physical units, i.e., they may be located in a place or may also be distributed among multiple network units. A part or all of the units may be selected as needed to achieve the purpose of the solutions of the present disclosure.

In addition, various functional units according to the embodiments of the present disclosure may all be integrated into a processing module, or various units may be used separately, or two or more units are integrated into a unit. The above integrated units may be implemented by hardware or by hardware and software functional units.

A person having ordinary skill in the art can understand that all or a part of steps for implementing the above method embodiments may be implemented by programs instructing related hardware. The programs may be stored in a computer readable storage medium. When the programs are executed, the steps of the above method embodiments are implemented. The storage medium may be a medium which can store program codes, such as a mobile storage device, a Read-Only Memory (ROM), a Random Access Memory (RAM), a disk, or a disc etc.

The above description is merely specific embodiments of the present disclosure, and the scope of the present disclosure is not limited thereto. Changes or substitutions, which can be obviously envisaged by those skilled persons in the art, should be included in the scope of the present disclosure without departing the scope defined by the appended claims.

What is claimed is:

1. An electronic device, comprising:
    a light detector, including a photonic crystal layer configured to reflect and transmit light with a first wavelength in a first incident light according to a voltage applied to the photonic crystal layer; and a photosensitive layer arranged at a light transmission side of the photonic crystal layer and configured to detect a first parameter of a first transmission light transmitted through the photonic crystal layer when the light with the first wavelength is reflected by the photonic crystal layer, and detect a second parameter of a second transmission light transmitted through the photonic crystal layer when the light with the first wavelength is transmitted through the photonic crystal layer; and
    a hardware processor configured to form a spectrum of the first waveform according to the first parameter and the second parameter, wherein,
    the first parameter is indicative of an intensity of the first transmission light, and the second parameter is indicative of an intensity of the second transmission light.

2. The electronic device according to claim 1, wherein,
    the light unit detector further comprises a light diffusion layer configured to enable the first incident light, which is incident on the light detector in an angle, to be incident uniformly on the photonic crystal layer.

3. The electronic device according to claim 1, wherein,
    the light detector further comprises a beam orientation layer configured to select the first incident light transmitted in a first direction.

4. The electronic device according to claim 1, wherein,
    the light detector further comprises a first transparent electrode layer and a second transparent electrode layer;
    the photonic crystal layer is arranged between the first transparent electrode layer and the second transparent electrode layer, wherein,
    the first transparent electrode layer and the second transparent electrode layer are configured to apply a voltage to the photonic crystal layer.

5. The electronic device according to claim 4, wherein,
    the first transparent electrode layer comprises M first transparent electrodes;
    the second transparent electrode layer comprises M second transparent electrodes;
    the photonic crystal layer comprises M regions;
    an $m^{th}$ first transparent electrode and an $m^{th}$ second transparent electrode form an $m^{th}$ electrode group which is controllable independently;
    vertical projections of the $m^{th}$ first transparent electrode and the $m^{th}$ second transparent electrode on the photonic crystal layer are located in an $m^{th}$ region of the photonic crystal layer, wherein,
    the $m^{th}$ electrode group is configured to apply a voltage to the $m^{th}$ region; and
    M is an integer not less than 2, and m is a positive integer not more than M.

6. The electronic device according to claim 1, wherein,
    the hardware processor is configured to determine a third intensity of the light with the first wavelength according to a difference between the second parameter and the first parameter, and determine the spectrum of the first wavelength according to the third intensity.

7. The electronic device according to claim 6, further comprising:
    a display connected to the hardware processor, wherein the hardware processor is configured to determine a color temperature value of an environment in which the electronic device is located according to the spectrum, determine an output parameter of the display according to the color temperature value, and control display of the display according to the output parameter.

* * * * *